(12) United States Patent
Mogi

(10) Patent No.: US 11,940,606 B2
(45) Date of Patent: Mar. 26, 2024

(54) OPTICAL SYSTEM AND IMAGING APPARATUS HAVING THE SAME

(71) Applicant: CANON KABUSHIKI KAISHA, Tokyo (JP)

(72) Inventor: Shuichi Mogi, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/988,962

(22) Filed: Nov. 17, 2022

(65) Prior Publication Data
US 2023/0080985 A1 Mar. 16, 2023

Related U.S. Application Data

(63) Continuation of application No. 17/146,688, filed on Jan. 12, 2021, now Pat. No. 11,536,934.

(30) Foreign Application Priority Data

Jan. 20, 2020 (JP) ................... 2020-006584

(51) Int. Cl.
*G02B 15/14* (2006.01)
*G02B 27/00* (2006.01)
*G02B 27/64* (2006.01)

(52) U.S. Cl.
CPC ......... *G02B 15/142* (2019.08); *G02B 27/005* (2013.01); *G02B 27/646* (2013.01)

(58) Field of Classification Search
CPC .. G02B 15/142; G02B 27/005; G02B 27/646; G02B 15/144105; G02B 15/145113; G02B 7/04; G02B 9/34; G02B 9/60; G02B 15/143105; G02B 3/0062; G02B 3/0087;
(Continued)

(56) References Cited

U.S. PATENT DOCUMENTS

| 9,110,275 B2 | 8/2015 | Mogi | |
| 9,900,514 B2 | 2/2018 | Mogi | |
| 2018/0217360 A1* | 8/2018 | Ikeda | ................... G02B 15/173 |

(Continued)

FOREIGN PATENT DOCUMENTS

| JP | 2007-065278 A | 3/2007 |
| JP | 2008-129460 A | 6/2008 |

(Continued)

OTHER PUBLICATIONS

Notice of Reasons for Rejection issued by the Japanese Patent Office dated Aug. 15, 2023 in corresponding JP Patent Application No. 2020-006584, with English translation.

*Primary Examiner* — Robert E. Tallman
(74) *Attorney, Agent, or Firm* — Carter, DeLuca & Farrell LLP

(57) ABSTRACT

An optical system includes, in order from an object side to an image side, a first lens unit having a positive refractive power, a first focus lens unit having a negative refractive power, and a second focus lens unit having a positive refractive power. The first lens unit is fixed during focusing. The first focus lens unit and the second focus lens unit move so that a distance between the first focus lens unit and the second focus lens unit changes during focusing. The first lens unit includes a single lens which is disposed closest to an object and has a negative refractive power. A predetermined condition is satisfied.

30 Claims, 13 Drawing Sheets

(58) Field of Classification Search
CPC ............ G02B 15/1441; G02B 15/1451; G02B 15/28; G03B 17/12; H04N 5/2254
See application file for complete search history.

(56) References Cited

U.S. PATENT DOCUMENTS

2021/0116687 A1  4/2021  Mogi
2021/0356731 A1  11/2021  Mogi

FOREIGN PATENT DOCUMENTS

| | | |
|---|---|---|
| JP | 2010-091669 A | 4/2010 |
| JP | 2014-006487 A | 1/2014 |
| JP | 2014-026023 A | 2/2014 |
| JP | 2014-142601 A | 8/2014 |
| JP | 2014-186306 A | 10/2014 |
| JP | 2017-211489 A | 11/2017 |
| JP | 2018-132674 A | 8/2018 |
| JP | 2020-173366 A | 10/2020 |
| WO | 2014/129170 A1 | 8/2014 |
| WO | 2020/105104 A1 | 5/2020 |
| WO | 2020/137650 A1 | 7/2020 |
| WO | 2020/158622 A1 | 8/2020 |

* cited by examiner

OPTICAL SYSTEM AND IMAGING APPARATUS HAVING THE SAME

CROSS REFERENCE TO RELATED APPLICATIONS

This application is a continuation of U.S. patent application Ser. No. 17/146,688, filed on Jan. 12, 2021, which claims the benefit of and priority to Japanese Patent Application No. 2020-006584, filed Jan. 20, 2020, each of which is hereby incorporated by reference herein in their entirety.

BACKGROUND OF THE INVENTION

Field of the Invention

The present invention relates to an optical system, which is suitable for a digital video camera, a digital still camera, a broadcasting camera, a film-based camera, a surveillance camera, and the like.

Description of the Related Art

The optical system used in an imaging apparatus has been recently required to miniaturize the entire lens diameter of a focusing unit and to satisfactorily correct the chromatic aberration and the curvature of field in photographing at a closest distance while increasing the photographing magnification. An optical system including, in order from an object side to an image side, a first lens unit having a positive refractive power, a focus lens unit having a negative refractive power, and a focus lens unit having a positive refractive power is known as an optical system satisfying the above requirement (see Japanese Patent Laid-Open Nos. ("JPs") 2017-211489 and 2018-132674).

The optical system in JP 2017-211489 reduces the weight of the focusing unit and can perform focusing in a wide photographing range while maintaining high optical performance at the entire photographing distances. However, since a ratio of a focal length of the focus lens unit having the positive refractive power to those of the focus lens unit having the negative refractive power is not properly set, a change in an angle of view during focusing increases. Thus, it is difficult to suppress the change in the angle of view when photographing while focusing during moving image photographing.

The optical system in JP 2018-132674 reduces aberration fluctuations, particularly fluctuations of the chromatic aberration during focusing, and has high optical performance in a wide range of object distances. However, since a ratio of a focal length of the focus lens unit having the positive refractive power to a back focus of the optical system is not properly set when achieving miniaturization and a large diameter of the optical system, it is difficult to suppress the aberration fluctuations during focusing.

SUMMARY OF THE INVENTION

The present invention provides an optical system that miniaturizes a focusing unit and can satisfactorily correct the chromatic aberration in a wide range of object distances, and an imaging apparatus having the same.

An optical system according to one aspect of the present invention includes, in order from an object side to an image side, a first lens unit having a positive refractive power, a first focus lens unit having a negative refractive power, and a second focus lens unit having a positive refractive power. The first lens unit is fixed during focusing. The first focus lens unit and the second focus lens unit move so that a distance between the first focus lens unit and the second focus lens unit changes during focusing. The first lens unit includes a single lens which is disposed closest to an object and has a negative refractive power. The following conditional expressions are satisfied:

$$-0.78 < ff2/ff1 < -0.20$$

$$2.20 < ff2/bf < 12.00$$

where ff1 is a focal length of the first focus lens unit, ff2 is a focal length of the second focus lens unit, and bf is a back focus of the optical system.

An imaging system according to another aspect of the present invention includes an optical system, and an image sensor configured to receive an image formed by the optical system. The optical system includes, in order from an object side to an image side, a first lens unit having a positive refractive power, a first focus lens unit having a negative refractive power, and a second focus lens unit having a positive refractive power. The first lens unit is fixed during focusing. The first focus lens unit and the second focus lens unit move so that a distance between the first focus lens unit and the second focus lens unit changes during focusing. The first lens unit includes a single lens which is disposed closest to an object and has a negative refractive power. The following conditional expressions are satisfied:

$$-0.78 < ff2/ff1 < -0.20$$

$$2.20 < ff2/bf < 12.00$$

where ff1 is a focal length of the first focus lens unit, ff2 is a focal length of the second focus lens unit, and bf is a back focus of the optical system.

Further features of the present invention will become apparent from the following description of exemplary embodiments with reference to the attached drawings.

DESCRIPTION OF THE EMBODIMENTS

Figure 1:
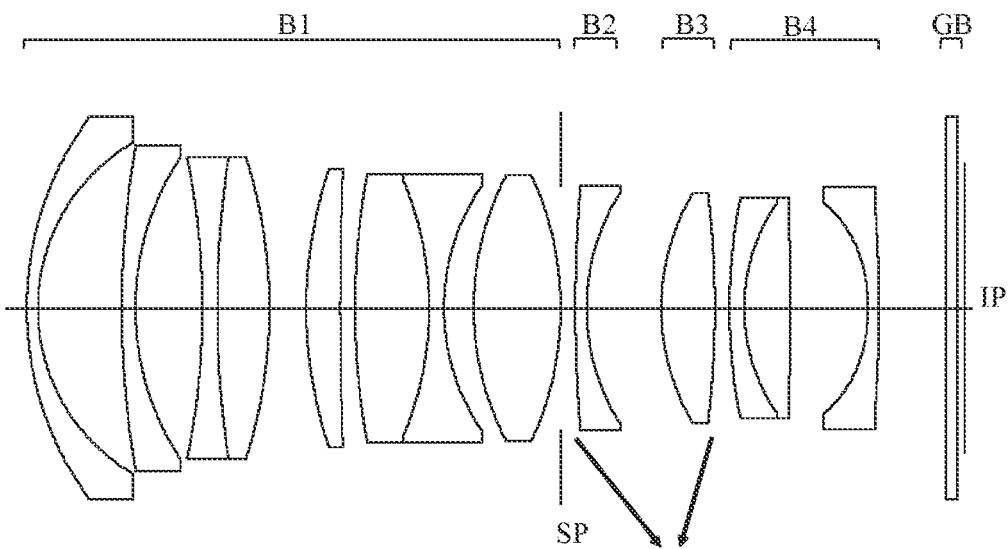
FIG. 1 is a sectional view of an optical system according to Example 1 when focused on an object at infinity.
Figure 2:
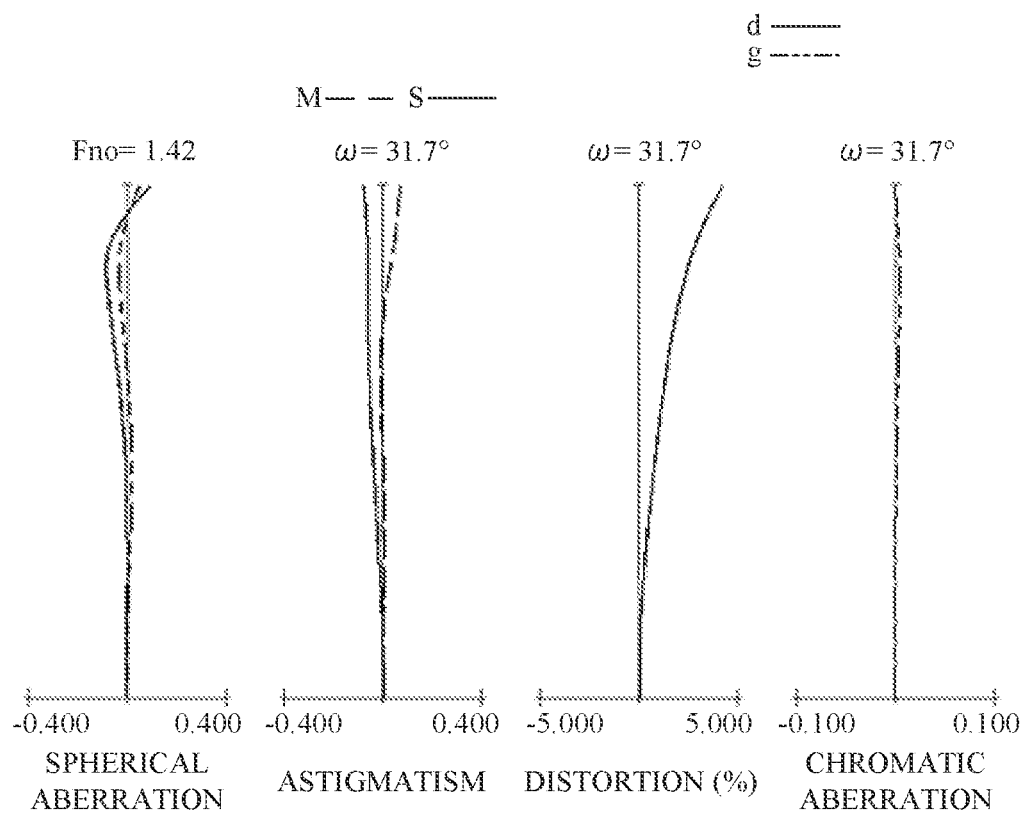
FIG. 2 is an aberration diagram of the optical system according to Example 1 when focused on an object at infinity.
Figure 3:
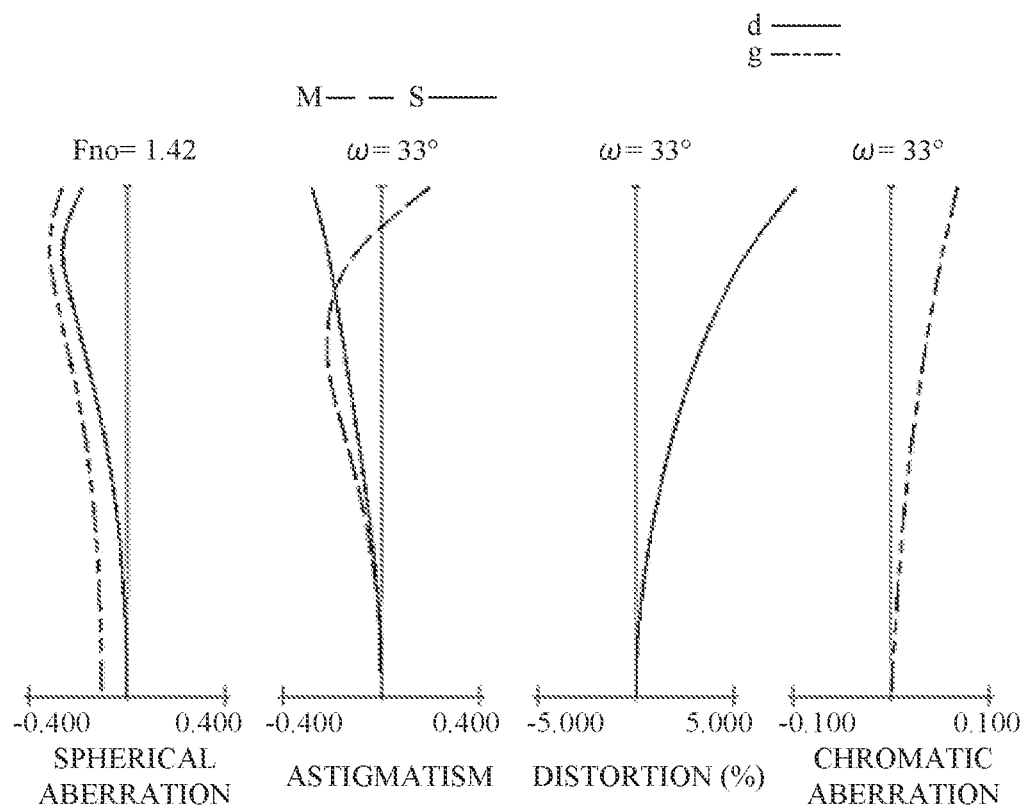
FIG. 3 is an aberration diagram of the optical system according to Example 1 when focused on an object at a closest distance.
Figure 4:
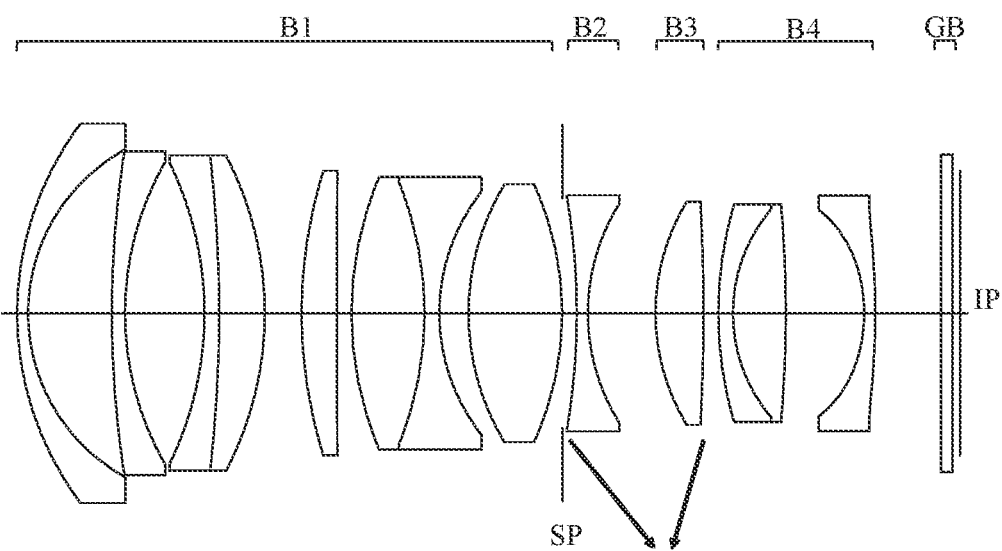
FIG. 4 is a sectional view of an optical system according to Example 2 when focused on an object at infinity.
Figure 5:
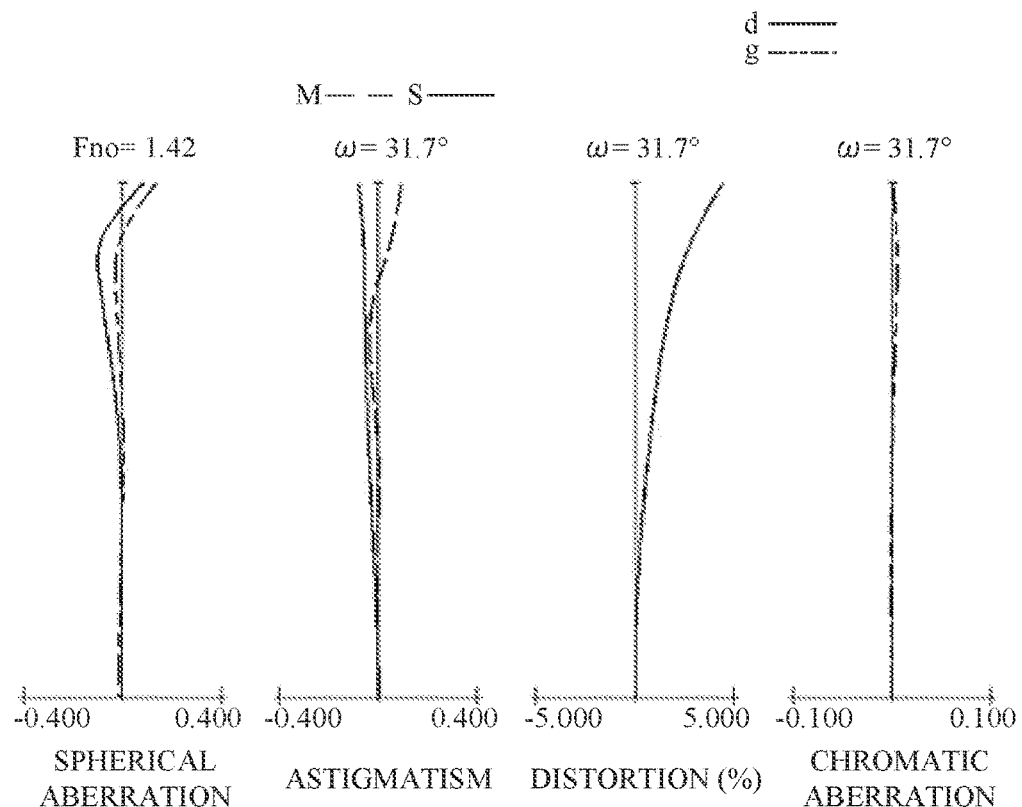
FIG. 5 is an aberration diagram of the optical system according to Example 2 when focused on an object at infinity.
Figure 6:
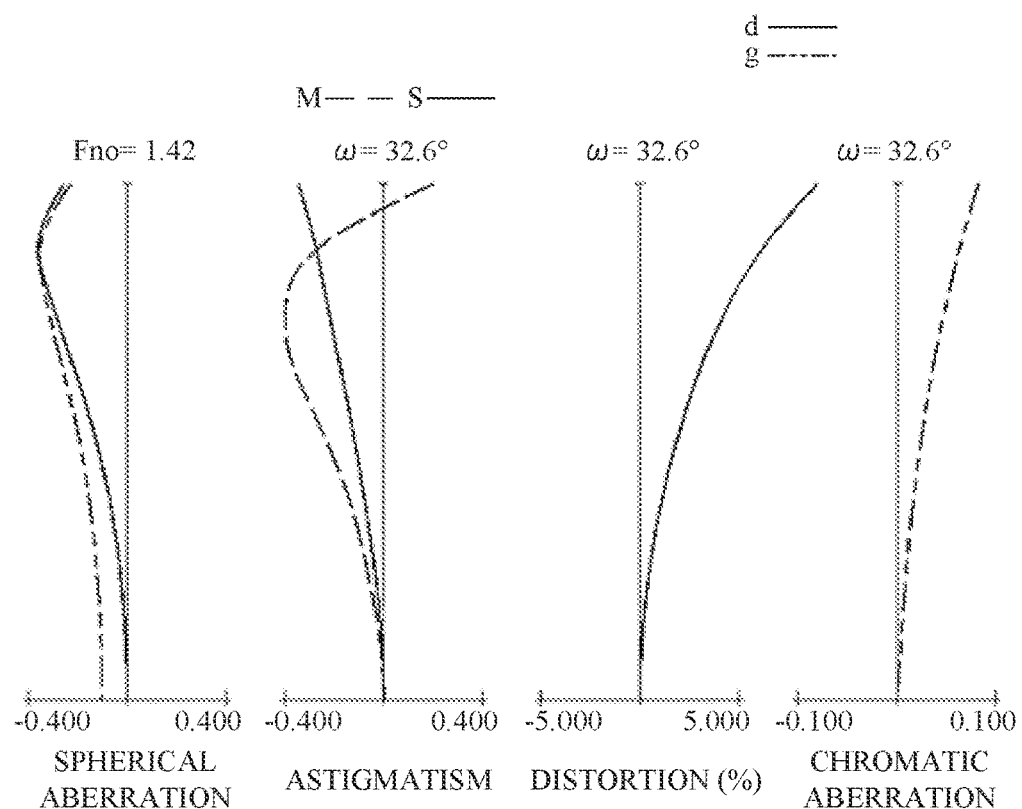
FIG. 6 is an aberration diagram of the optical system according to Example 2 when focused on an object at a closest distance.
Figure 7:
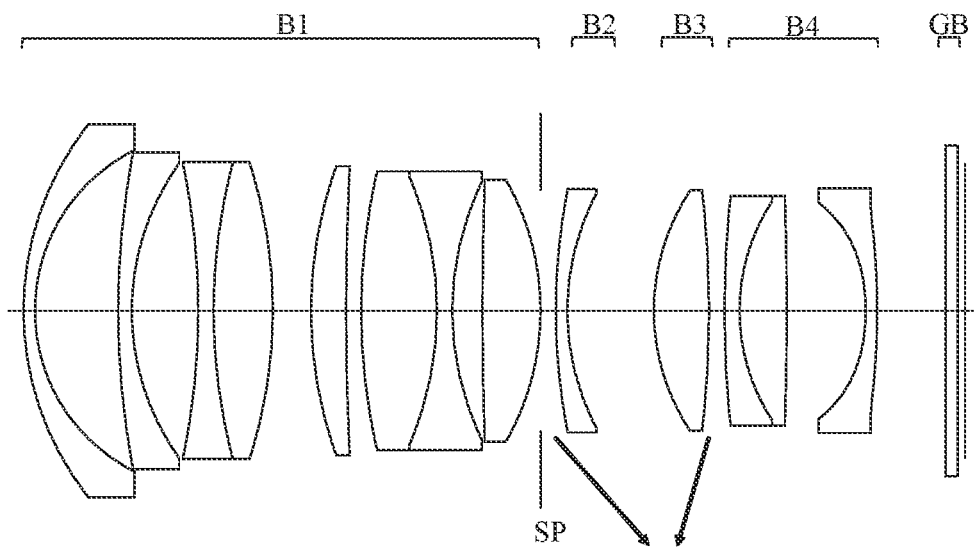
FIG. 7 is a sectional view of an optical system according to Example 3 when focused on an object at infinity.
Figure 8:
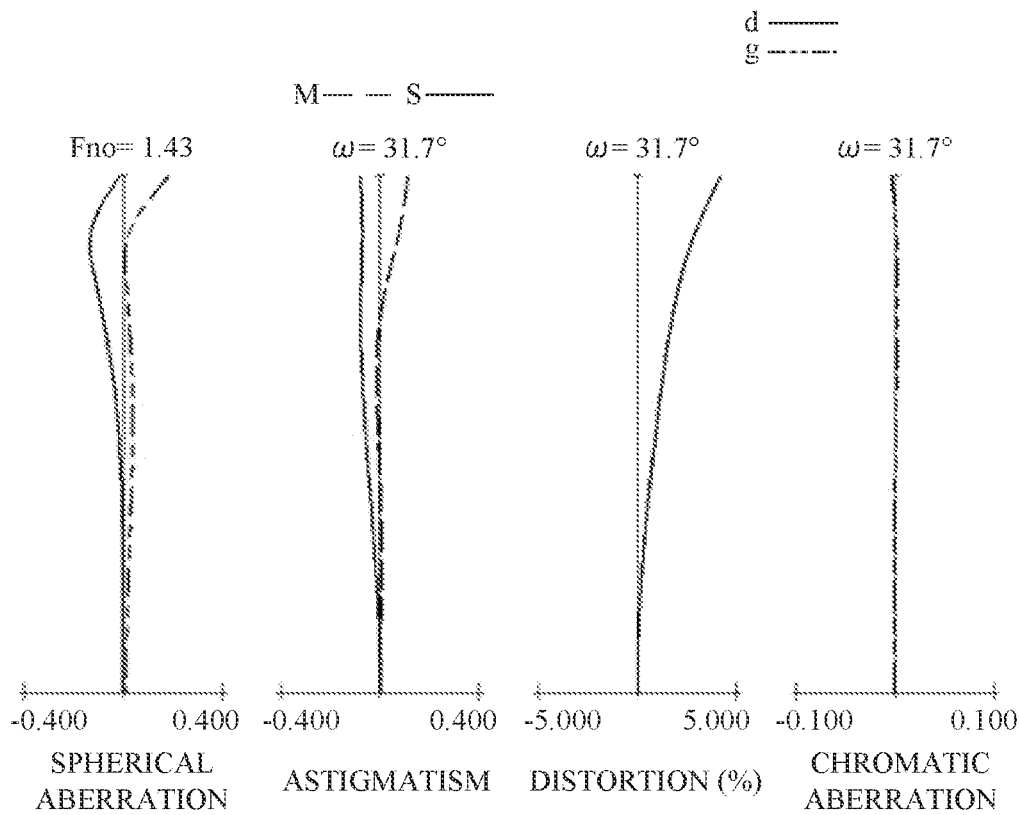
FIG. 8 is an aberration diagram of the optical system according to Example 3 when focused on an object at infinity.
Figure 9:
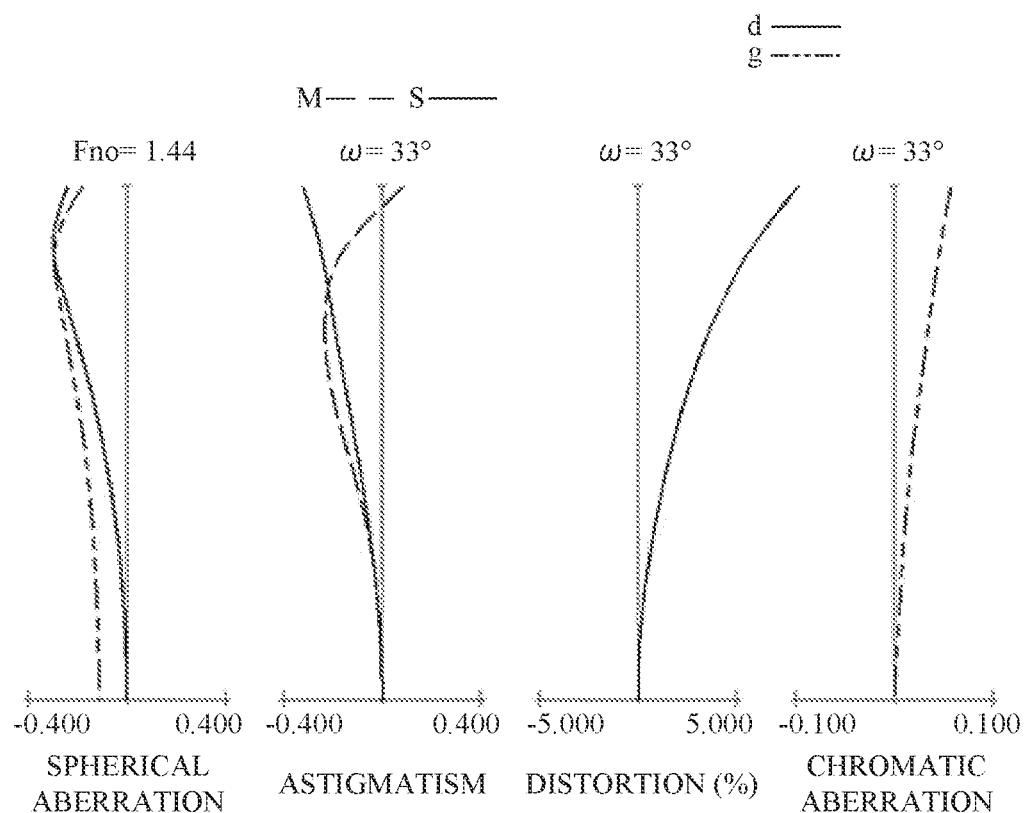
FIG. 9 is an aberration diagram of the optical system according to Example 3 when focused on an object at a closest distance.
Figure 10:
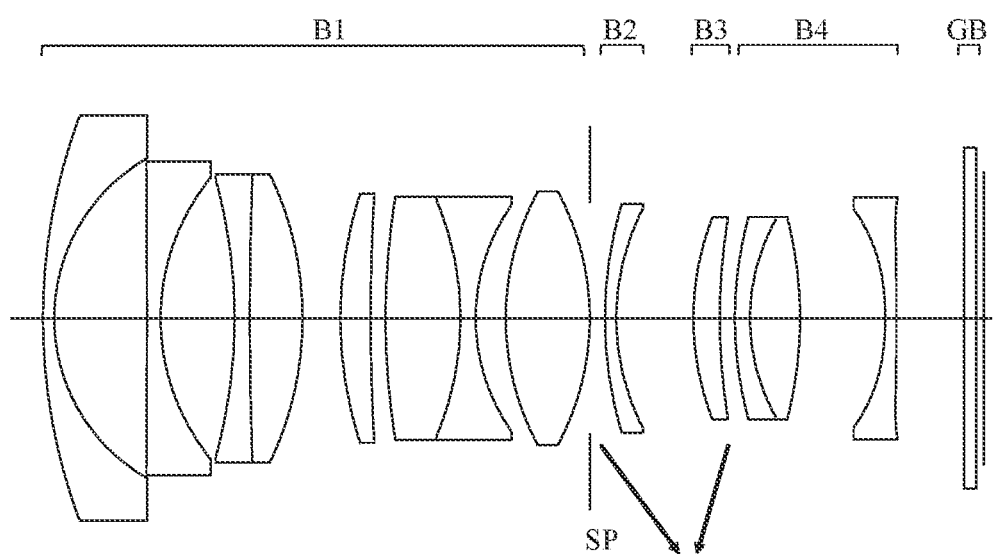
FIG. 10 is a sectional view of an optical system according to Example 4 when focused on an object at infinity.
Figure 11:
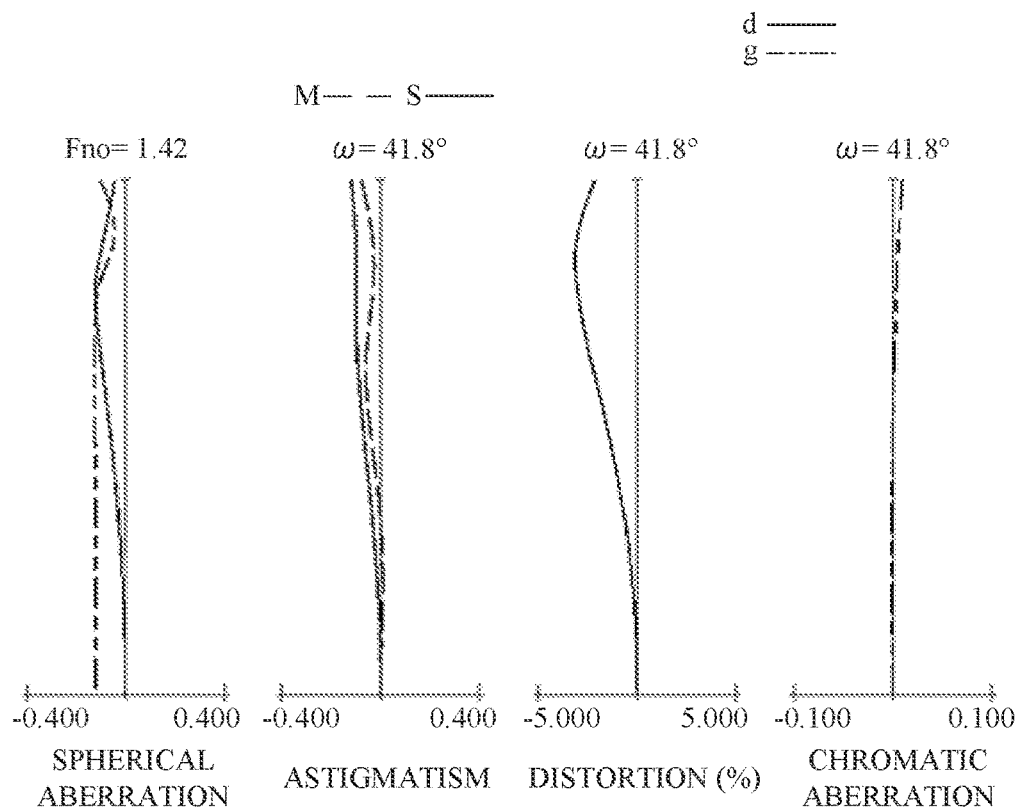
FIG. 11 is an aberration diagram of the optical system according to Example 4 when focused on an object at infinity.
Figure 12:
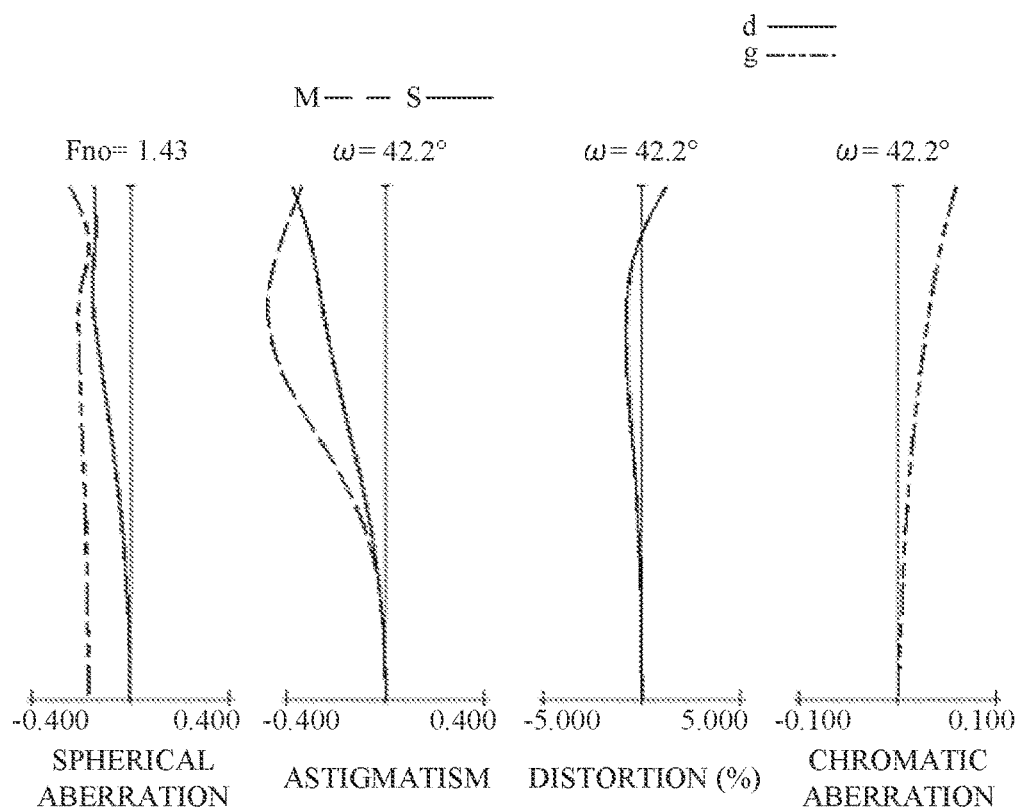
FIG. 12 is an aberration diagram of the optical system according to Example 4 when focused on an object at a closest distance.
Figure 13:
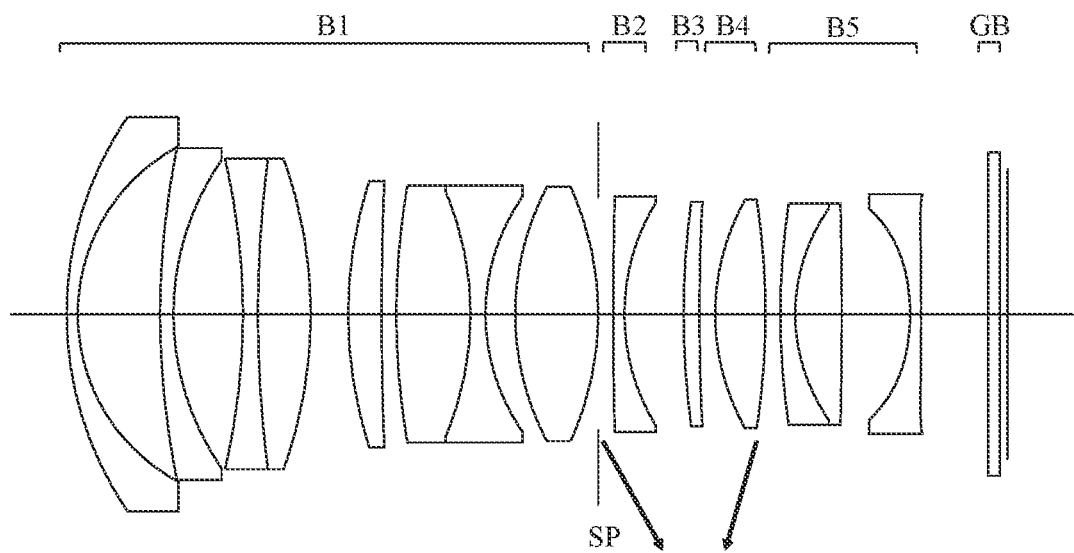
FIG. 13 is a sectional view of an optical system according to Example 5 when focused on an object at infinity.
Figure 14:
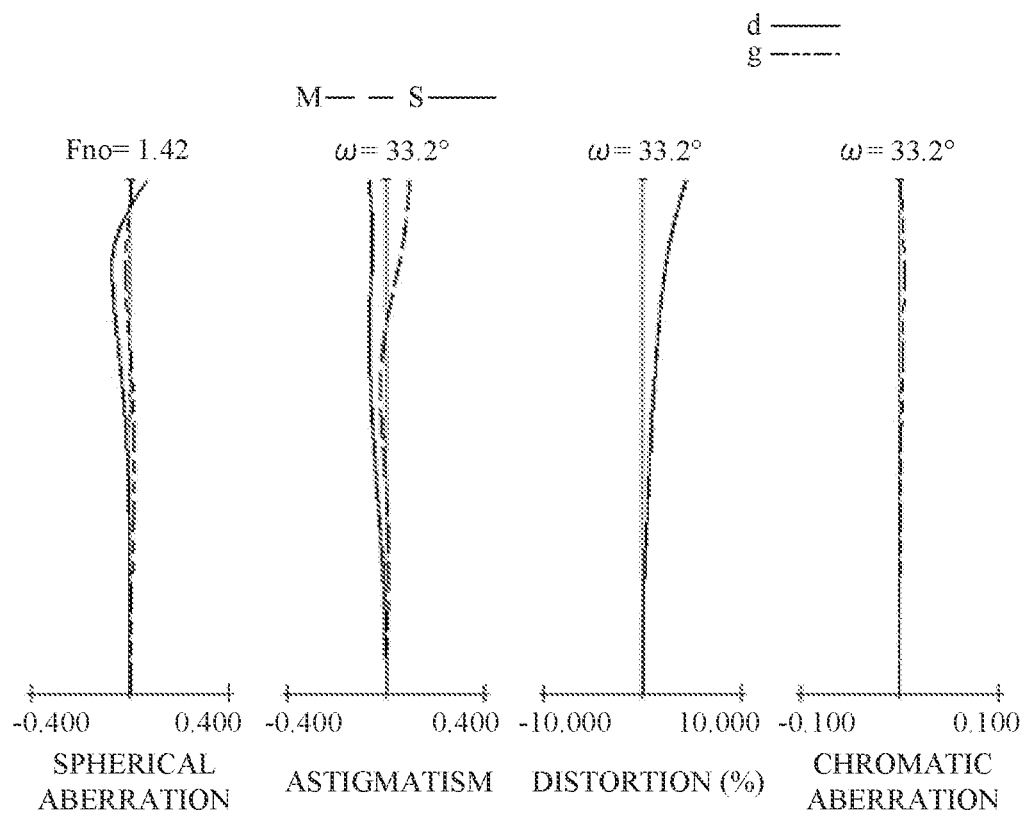
FIG. 14 is an aberration diagram of the optical system according to Example 5 when focused on an object at infinity.
Figure 15:
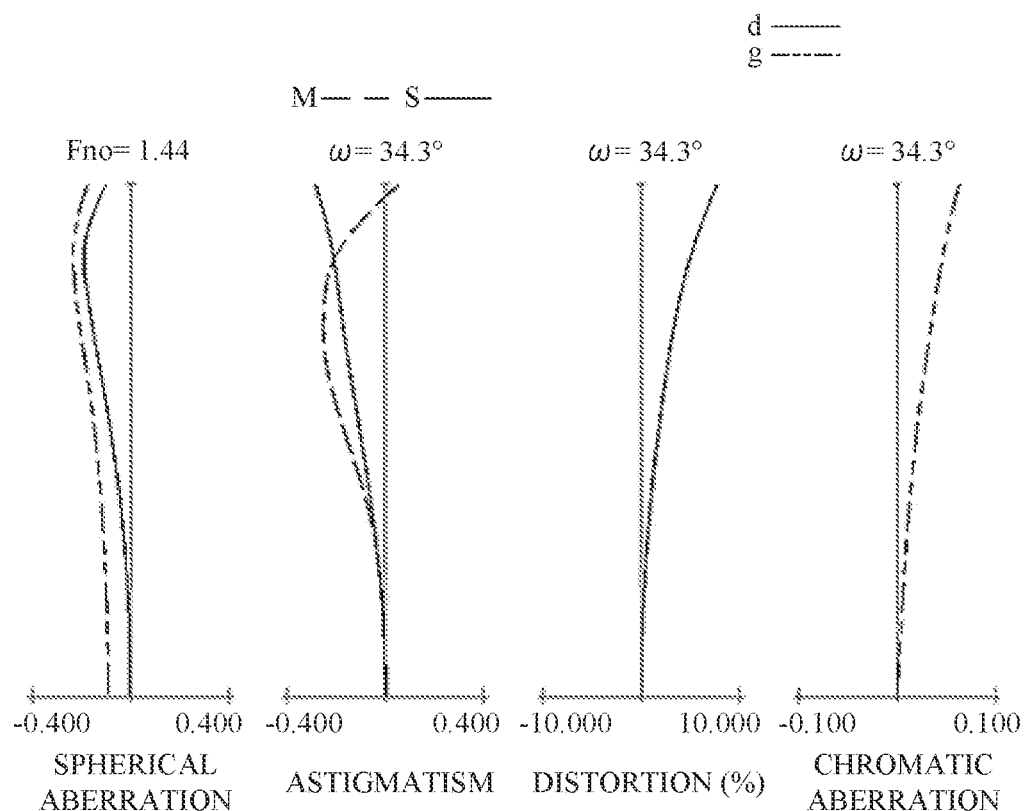
FIG. 15 is an aberration diagram of the optical system according to Example 5 when focused on an object at a closest distance.
Figure 16:
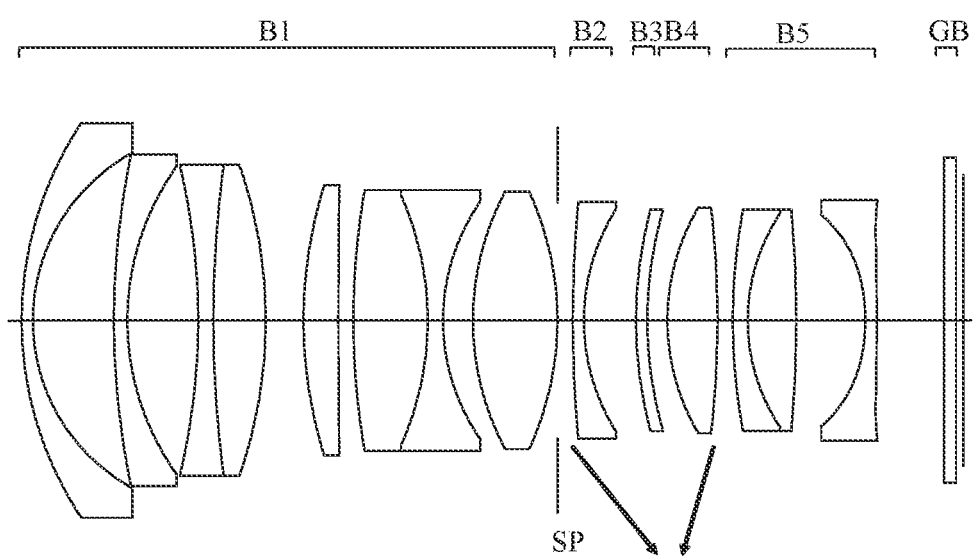
FIG. 16 is a sectional view of an optical system according to Example 6 when focused on an object at infinity.
Figure 17:
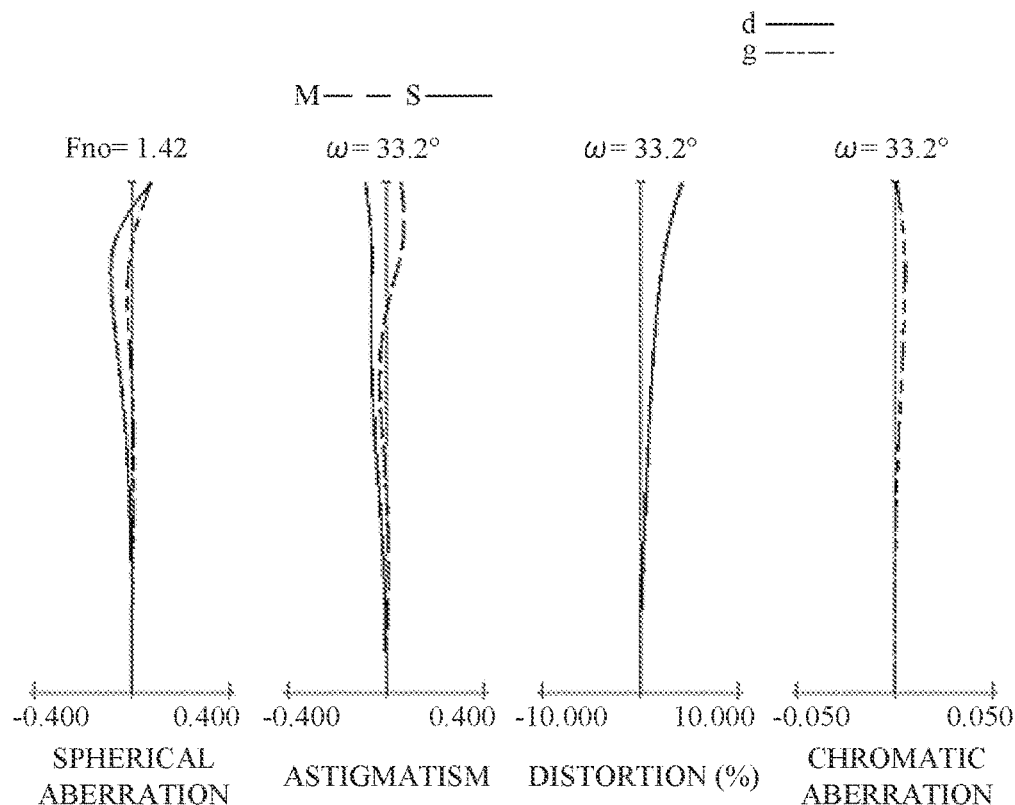
FIG. 17 is an aberration diagram of the optical system according to Example 6 when focused on an object at infinity.
Figure 18:
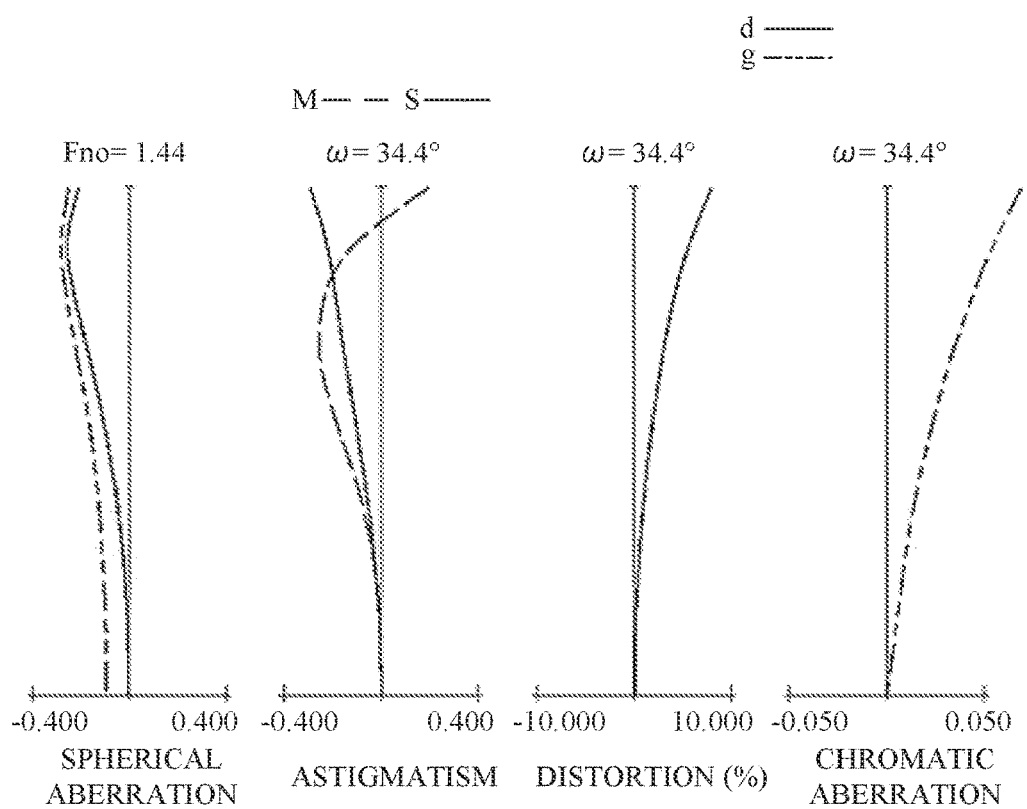
FIG. 18 is an aberration diagram of the optical system according to Example 6 when focused on an object at a closest distance.
Figure 19:
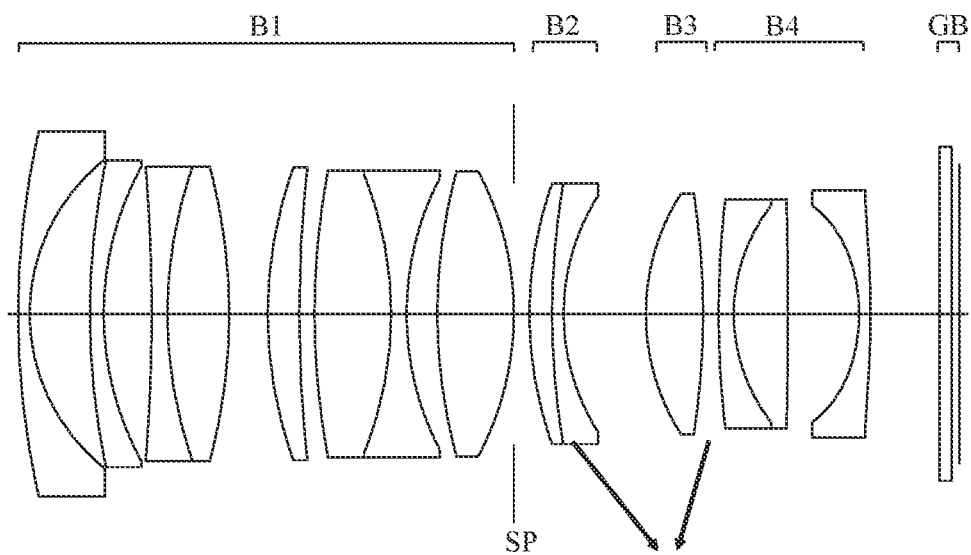
FIG. 19 is a sectional view of an optical system according to Example 7 when focused on an object at infinity.
Figure 20:
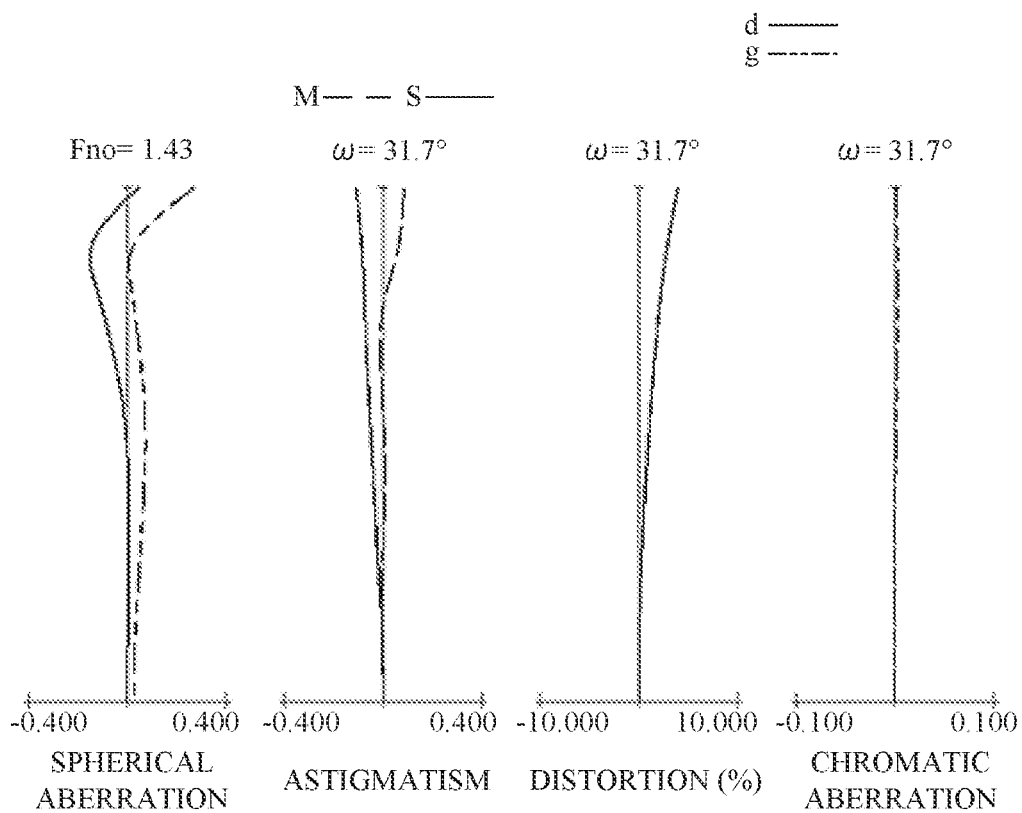
FIG. 20 is an aberration diagram of the optical system according to Example 7 when focused on an object at infinity.
Figure 21:
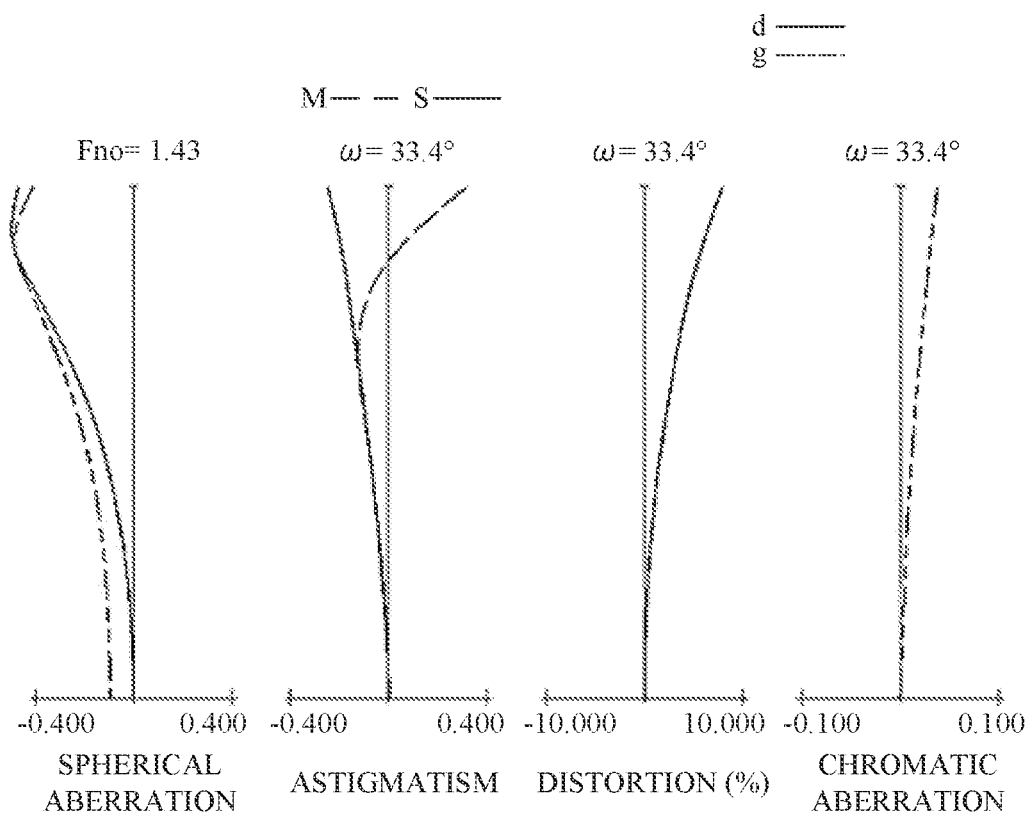
FIG. 21 is an aberration diagram of the optical system according to Example 7 when focused on an object at a closest distance.
Figure 22:
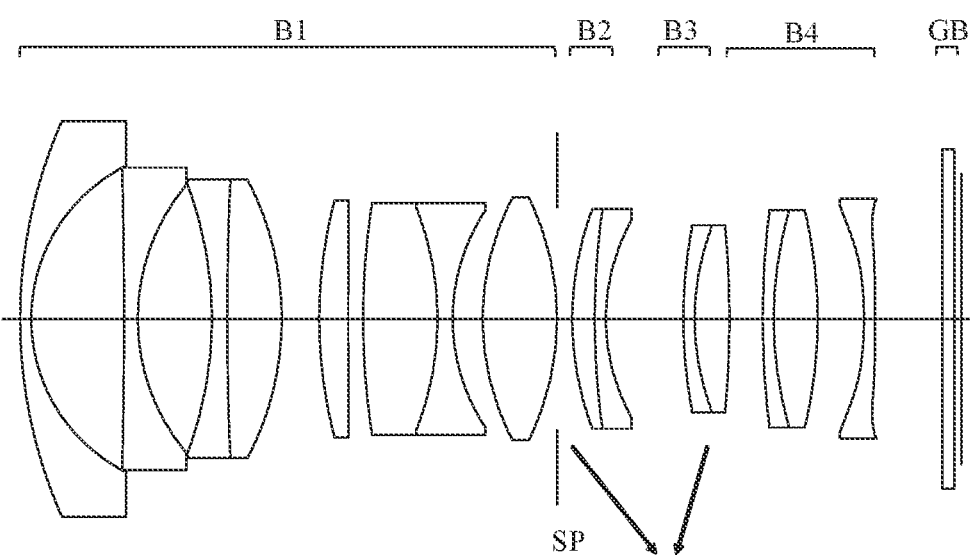
FIG. 22 is a sectional view of an optical system according to Example 8 when focused on an object at infinity.
Figure 23:
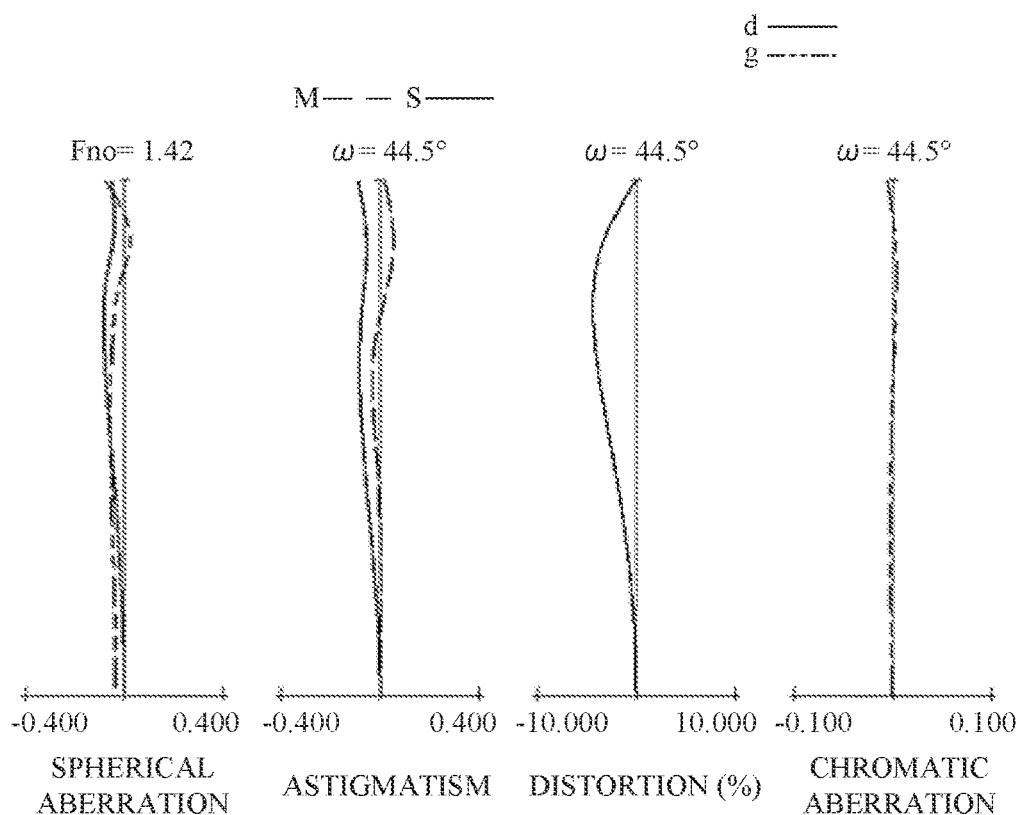
FIG. 23 is an aberration diagram of the optical system according to Example 8 when focused on an object at infinity.
Figure 24:
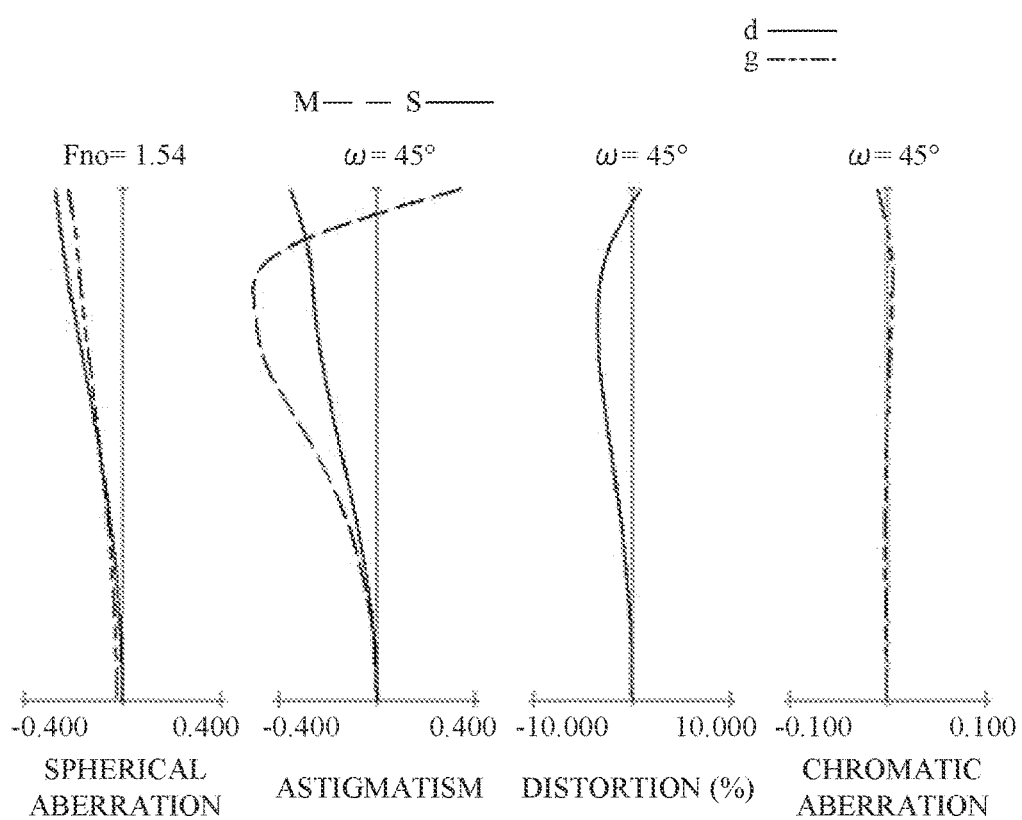
FIG. 24 is an aberration diagram of the optical system according to Example 8 when focused on an object at a closest distance.

Referring now to the accompanying drawings, a detailed description will be given of embodiments according to the present invention. Corresponding elements in respective figures will be designated by the same reference numerals, and a duplicate description thereof will be omitted.

FIGS. 1, 4, 7, 10, 13, 16, 19 and 22 are sectional views of optical systems according to Examples 1 to 8 when focused on an object at infinity, respectively. The optical system according to each example is used for an imaging apparatus, such as a digital video camera, a digital still camera, a broadcasting camera, a film-based camera, and a surveillance camera.

In each lens cross sectional view, a left side is an object side (front) and a right side is an image side (rear). The optical system according to each example has a plurality of lens units. In the specification of this application, the lens unit is a group of lenses that move or stand still integrally during focusing. That is, in the optical system according to each example, a distance between adjacent lens units changes during focusing. The lens unit may include one or more lenses. The lens unit may include an aperture stop.

The optical system according to each example includes, in order from an object side to an image side, a first lens unit having a positive refractive power, a first focus lens unit having a negative refractive power, and a second focus lens unit having a positive refractive power. The first lens unit includes a single lens which is disposed closest to an object and has a negative refractive power.

In each lens cross sectional view, Bi represents an i-th lens unit (i is a natural number) among the lens units included in the optical system counted from the object side.

SP represents the aperture stop. GB is an optical block corresponding to an optical filter, a face plate, a low-pass filter, an infrared cut filter, or the like. IP is an image plane, and when the optical system according to each example is used for an imaging optical system in a digital still camera or a digital video camera, an imaging plane of a solid state image sensor (photoelectric conversion element), such as a CCD sensor or a CMOS sensor, is placed on the image plane IP. When the optical system according to each example is used for an imaging optical system in a film-based camera, a photosensitive plane corresponding to a film plane is placed on the image plane IP.

In the optical system according to each example, the first lens unit is fixed during focusing, and the first focus lens unit and the second focus lens unit move along different loci so that a distance between the first focus lens unit and the second focus lens unit changes during focusing. An arrow shown in each lens cross sectional view shows a moving locus of each focus lens unit during focusing from infinity to a closest distance.

With this configuration, the aberration in a wide range of object distances can be suppressed. Additionally, a change in an angle of view when photographing while focusing during moving image photographing can be suppressed.

FIGS. 2, 5, 8, 11, 14, 17, 20 and 23 are aberration diagrams of the optical systems according to Examples 1 to 8 when focused on an object at infinity, respectively. FIGS. 3, 6, 9, 12, 15, 18, 21 and 24 are aberration diagrams of the optical systems according to Examples 1 to 8 when focused on an object at a closest distance.

In the spherical aberration diagram, Fno represents an F-number, and spherical aberration amounts for the d-line (wavelength 587.6 nm) and the g-line (wavelength 435.8 nm) are shown. In the astigmatism diagram, M is an astigmatism amount on a meridional image plane, and S is an astigmatism amount on a sagittal image plane. The distortion diagram shows a distortion amount for the d-line. The chromatic aberration diagram shows a chromatic aberration amount for the g-line. w represents a half angle of view (degree).

Next, a description will be given of a characteristic configuration in the optical system according to each example.

The optical system according to each example satisfies the following conditional expressions (1) and (2):

$$-0.78 < ff2/ff1 < -0.20 \tag{1}$$

$$2.20 < ff2/bf < 12.00 \tag{2}$$

Where ff1 is a focal length of the first focus lens unit, ff2 is a focal length of the second focus lens unit, and bf is a back focus of the optical system.

The conditional expression (1) defines a ratio of the focal length of the first focus lens unit and the focal length of the second focus lens unit. If the value is larger than the upper limit in the conditional expression (1), the focal length of the second focus lens unit would shorten, and consequently it would be difficult to suppress the spherical aberration and the curvature of field in a photographing range. Additionally, since the focal length of the first focus lens unit would lengthen, an exit pupil position in the optical system would come closer to the image plane, and consequently it would be difficult to secure telecentricity in a range adaptable to an electronic image sensor (solid state image sensor). On the other hand, if the value is smaller than the lower limit in the conditional expression (1), the focal length of the second focus lens unit would lengthen, and if a photographing distance in photographing shortens, a proper moving quantity during focusing would increase, and consequently it would be difficult to perform high speed focusing.

The conditional expression (2) defines a ratio of the focal length of the second focus lens unit and the back focus of the optical system. If the value is larger than the upper limit in the conditional expression (2), the focal length of the second focus lens unit would lengthen, and if a photographing distance in photographing shortens, a proper moving quantity during focusing would increase, and consequently it would be difficult to perform high speed focusing. On the other hand, if the value is smaller than the lower limit in the conditional expression (2), the focal length of the second focus lens unit would shorten, and consequently it would be difficult to suppress the spherical aberration and the curvature of field in a photographing range.

The numerical ranges of the conditional expressions (1) and (2) may be replaced with those in the following conditional expressions (1a) and (2a).

$$-0.77 < ff2/ff1 < -0.21 \tag{1a}$$

$$2.43 < ff2/bf < 10.66 \tag{2a}$$

The numerical ranges of the conditional expressions (1) and (2) may be replaced with those in the following conditional expressions (1b) and (2b).

$$-0.75 < ff2/ff1 < -0.22 \tag{1b}$$

$$2.66 < ff2/bf < 9.32 \tag{2b}$$

The optical system according to each example may satisfy the following conditional expression (3):

$$0.10 < f/x1 < 2.00 \tag{3}$$

Where f is a focal length of the optical system, and x1 is a distance on an optical axis from the aperture stop to the image plane when focused on an object at infinity.

The conditional expression (3) defines a ratio of the focal length of the optical system and the distance on the optical axis from the aperture stop to the image plane when focused on an object at infinity. If the value is larger than the upper limit in the conditional expression (3), since the distance on the optical axis from the aperture stop to the image plane when focused on an object at infinity would shorter, the exit pupil position in the optical system would come closer to the image plane, and consequently it would be difficult to secure telecentricity in a range adaptable to an electronic image sensor. On the other hand, if the value is smaller than the lower limit in the conditional expression (3), the distance on the optical axis from the aperture stop to the image plane when focused on an object would lengthen, and consequently it would be difficult to suppress the whole length of the optical system.

The optical system according to each example may satisfy the following conditional expression (4):

$$-40.00 < ff1/f < -0.20 \tag{4}$$

The conditional expression (4) defines a ratio of the focal length of the first focus lens unit and the focal length of the optical system. If the value is larger than the upper limit in the conditional expression (4), the focal length of the first focus lens unit would shorten, and consequently it would be difficult to suppress the spherical aberration and the curvature of field in a photographing range. On the other hand, if the value is smaller than the lower limit in the conditional expression (4), the focal length of the first focus lens unit would lengthen, and if a photographing distance in photographing shortens, a proper moving quantity during focusing would increase, and consequently it would be difficult to perform high speed focusing.

The optical system according to each example may satisfy the following conditional expression (5):

$$0.20 < ff2/f < 15.00 \tag{5}$$

The conditional expression (5) defines a ratio of the focal length of the second focus lens unit and the focal length of the optical system. If the value is larger than the upper limit in the conditional expression (5), since the focal length of the second focus lens unit would lengthen, a proper moving quantity during focusing would increase, and consequently it would be difficult to perform high speed focusing. On the other hand, if the value is smaller than the lower limit in the conditional expression (5), the focal length of the second focus lens unit would shorten, and consequently it would be difficult to suppress the spherical aberration and the curvature of field in a photographing range.

The optical system according to each example may satisfy the following conditional expression (6):

$$0.20 < f/y < 8.00 \tag{6}$$

Where y is a radius of an image circle.

The conditional expression (6) defines a ratio of the radius of the image circle and the focal length of the optical system. If the value is smaller than the lower limit in the conditional expression (6), since the focal length of the optical system would shorten, the lateral chromatic aberration, the coma aberration, and the curvature of field would increase, and consequently it would be difficult to correct these aberrations. On the other hand, if the value is larger than the upper limit in the conditional expression (6), it would be difficult to acquire a desired angle of view.

The optical system according to each example satisfies the following conditional expression (7):

$$0.10 < sfff1 < 20.00 \tag{7}$$

Where sfff1 is a shape factor of a negative lens having the largest refractive power among negative lenses included in the first focus lens unit.

The shape factor sfff1 is expressed by the following expression:

$$sfff1 = (gff1r1 + gff1r2)/(gff1r1 - gff1r2)$$

Where gff1r1 is a radius of curvature of a surface on the object side of the negative lens having the largest refractive power among negative lenses included in the first focus lens unit, and gff1r2 is a radius of curvature of a surface on the image side of the negative lens having the largest refractive power among negative lenses included in the first focus lens unit.

The conditional expression (7) defines the shape factor of the first focus lens unit. If the value is larger than the upper limit in the conditional expression (7), the radius of curvature on the image side of the first focus lens unit would enlarge, and consequently it would be difficult to secure telecentricity in a range adaptable to an electronic image sensor. On the other hand, if the value is smaller than the lower limit in the conditional expression (7), the radius of curvature on the image side of the first focus lens unit would shrink, and consequently it would be difficult to secure a lens distance between the first focus lens unit and the second focus lens unit.

The optical system according to each example satisfies the following conditional expression (8):

$$-12.00 < sfff2 < -0.10 \quad (8)$$

Where sfff2 is a shape factor of a positive lens having the largest refractive power among positive lenses included in the second focus lens unit.

The shape factor sfff2 is expressed by the following expression:

$$sfff2 = (gff2r1 + gff2r2)/(gff2r1 - gff2r2)$$

Where gff2r1 is a radius of curvature of a surface on the object side of the positive lens having the largest refractive power among positive lenses included in the second focus lens unit, and gff2r2 is a radius of curvature of a surface on the image side of the positive lens having the largest refractive power among positive lenses included in the second focus lens unit.

The conditional expression (8) defines the shape factor of the second focus lens unit. If the value is larger than the upper limit in the conditional expression (8), the radius of curvature on the object side of the second focus lens unit would enlarge, and consequently it would be difficult to secure telecentricity in a range adaptable to an electronic image sensor. On the other hand, if the value is smaller than the lower limit in the conditional expression (8), the radius of curvature on the object side of the second focus lens unit would shrink, and consequently it would be difficult to secure an edge thickness of the positive lens.

The optical system according to each example satisfies the following conditional expression (9):

$$0.50 < \beta ff1/\beta ff2 < 400.0 \quad (9)$$

Where $\beta ff1$ is a lateral magnification of the first focus lens unit when focused on an object at infinity, and $\beta ff2$ is a lateral magnification of the second focus lens unit when focused on an object at infinity.

The conditional expression (9) defines a ratio of the lateral magnification of the first focus lens unit and the lateral magnification of the second focus lens unit. If the value is larger than the upper limit in the conditional expression (9), the lateral magnification of the first focus lens unit would enlarge, and consequently it would be difficult to suppress the lateral chromatic aberration, the spherical aberration, and the coma aberration of the optical system. On the other hand, if the value is smaller than the lower limit in the conditional expression (9), the lateral magnification of the first focus lens unit would shrink, and if a photographing distance in photographing shortens, a proper moving quantity during focusing would increase, and consequently it would be difficult to perform high speed focusing.

The optical system according to each example satisfies the following conditional expression (10):

$$-25.00 < ffrn/f < -0.40 \quad (10)$$

Where ffrn is a focal length of a negative lens having the largest refractive power among negative lenses disposed between the second focus lens unit and the image plane when focused on an object at infinity.

The conditional expression (10) defines a ratio of the focal length of the negative lens having the largest refractive power among negative lenses disposed between the second focus lens unit and the image plane when focused on an object at infinity and the focal length of the optical system.

If the value is larger than the upper limit in the conditional expression (10), the focal length of the negative lens would shorten, and consequently it would be difficult to secure telecentricity in a range adaptable to an electronic image sensor. On the other hand, if the value is smaller than the lower limit in the conditional expression (10), since the focal length of the negative lens would lengthen, a radius of a final lens disposed closest to an image of the optical system would enlarge, and consequently a radius of a mount for attaching the optical system to an imaging apparatus would grow in size. As a result, it would be difficult to reduce a size and a weight of the optical system and the imaging apparatus.

The optical system according to each example may satisfy the following conditional expression (11):

$$-20.00 < Mff1/Mff2 < -0.30 \quad (11)$$

Where Mff1 is a relative moving quantity of the first focus lens unit to the image plane during focusing from infinity to a closest distance, and Mff2 is a relative moving quantity of the second focus lens unit to the image plane during focusing from infinity to a closest distance. A moving direction from the object side to the image side is set as positive.

The conditional expression (11) defines a ratio of the relative moving quantity of the first focus lens unit to the image plane and the relative moving quantity of the second focus lens unit to the image plane. If the value is larger than the upper limit in the conditional expression (11), since a moving quantity of the first focus lens unit would be large, a proper moving quantity during focusing would increase, and consequently it would be difficult to perform high speed focusing. On the other hand, if the value is smaller than the lower limit in the conditional expression (11), the moving quantity of the first focus lens unit would be small, and consequently it would be difficult to suppress a change in an angle of view when photographing while focusing during moving image photographing.

The optical system according to each example satisfies the following conditional expression (12):

$$0.40 < di/f < 10.00 \quad (12)$$

Where di is a distance on the optical axis from a surface closest to the image of the first focus lens unit to the image plane when focus on an object at infinity.

The conditional expression (12) defines a ratio of the distance on the optical axis from the surface closest to the image of the first focus lens unit to the image plane and the focal length of the optical system. If the value is larger than the upper limit in the conditional expression (12), the distance on the optical axis from the surface closest to the image of the first focus lens unit to the image plane would lengthen, and consequently it would be difficult to suppress the whole length of the optical system. On the other hand, if the value is smaller than the lower limit in the conditional expression (12), the exit pupil position in the optical system would come closer to the image plane, and consequently it would be difficult to secure telecentricity in a range adaptable to an electronic image sensor.

The optical system according to each example satisfies the following conditional expression (13):

$$-400.00 < ff1/ff1gt < -5.00 \quad (13)$$

Where ff1gt is a distance on the optical axis from a surface closest to the object of the first focus lens unit to the surface closest to the image of the first focus lens unit.

The conditional expression (13) defines a ratio of the focal length of the first focus lens unit and the distance on the optical axis from the surface closest to the object of the first focus lens unit to the surface closest to the image of the first focus lens unit. If the value is larger than the upper limit in the conditional expression (13), the distance on the optical axis from the surface closest to the object of the first focus lens unit to the surface closest to the image of the first focus lens unit would shorten, and consequently it would be difficult to secure an edge thickness and a central thickness of each lens. On the other hand, if the value is smaller than the lower limit in the conditional expression (13), the distance on the optical axis from the surface closest to the object of the first focus lens unit to the surface closest to the image of the first focus lens unit would lengthen, and consequently a weight of a focusing unit would increase. As a result, an apparatus to drive lenses is required to be increased in output to achieve high speed focusing, and thus it is difficult to miniaturize the imaging apparatus.

The optical system according to each example satisfies the following conditional expression (14):

$$1.00 < ff2/ff2gt < 100.00 \tag{14}$$

Where ff2gt is a distance on the optical axis from a surface closest to the object of the second focus lens unit to a surface closest to the image of the second focus lens unit.

The conditional expression (14) defines a ratio of the focal length of the second focus lens unit and the distance on the optical axis from the surface closest to the object of the second focus lens unit to the surface closest to the image of the second focus lens unit. If the value is larger than the upper limit in the conditional expression (14), the distance on the optical axis from the surface closest to the object of the second focus lens unit to the surface closest to the image of the second focus lens unit would lengthen, and consequently the weight of the focusing unit would increase. As a result, an apparatus to drive lenses is required to be increased in output to achieve high speed focusing, and thus it is difficult to miniaturize the imaging apparatus. On the other hand, if the value is smaller than the lower limit in the conditional expression (14), the distance on the optical axis from the surface closest to the object of the second focus lens unit to the surface closest to the image of the second focus lens unit would shorten, and consequently it would be difficult to secure the edge thickness and the central thickness of each lens.

The optical system according to each example satisfies the following conditional expression (15):

$$0.20 < f1/f < 10.00 \tag{15}$$

Where f1 is a focal length of the first lens unit.

The conditional expression (15) defines a ratio of the focal length of the first lens unit and the focal length of the optical system. If the value is larger than the upper limit in the conditional expression (15), the focal length of the first lens unit would lengthen, and consequently it would be difficult to suppress the whole length of the optical system. On the other hand, if the value is smaller than the lower limit in the conditional expression (15), the focal length of the first lens unit would shorten, and consequently it would be difficult to suppress the coma aberration, the lateral chromatic aberration, and the spherical aberration in ordinary photographing.

The numerical ranges of the conditional expressions (3) to (15) may be replaced with those in the following conditional expressions (3a) to (15a).

$$0.20 < fx1 < 1.55 \tag{3a}$$

$$-30.85 < ff1/f < -0.61 \tag{4a}$$

$$0.44 < ff2/f < 11.22 \tag{5a}$$

$$0.24 < f/y < 5.87 \tag{6a}$$

$$0.24 < sfff1 < 14.68 \tag{7a}$$

$$-8.88 < sfff2 < -0.24 \tag{8a}$$

$$1.15 < \beta ff1/\beta ff2 < 306.00 \tag{9a}$$

$$-18.57 < ffrn/f < -0.81 \tag{10a}$$

$$-14.82 < Mff1/Mff2 < -0.69 \tag{11a}$$

$$0.74 < di/f < 7.38 \tag{12a}$$

$$-308.34 < ff1/ff1gt < -12.00 \tag{13a}$$

$$2.00 < ff2/ff2gt < 75.00 \tag{14a}$$

$$0.51 < f1/f < 7.27 \tag{15a}$$

The numerical ranges of the conditional expressions (3) to (15) may be replaced with those in the following conditional expressions (3b) to (15b).

$$0.31 < fx1 < 1.10 \tag{3b}$$

$$-21.69 < ff1/f < -1.01 \tag{4b}$$

$$0.68 < ff2/f < 7.43 \tag{5b}$$

$$0.39 < f/y < 1.90 \tag{6b}$$

$$0.39 < sfff1 < 9.36 \tag{7b}$$

$$-5.76 < sfff2 < -0.38 \tag{8b}$$

$$1.80 < \beta ff1/\beta ff2 < 212.00 \tag{9b}$$

$$-12.14 < ffrn/f < -1.21 \tag{10b}$$

$$-9.64 < Mff1/Mff2 < -1.08 \tag{11b}$$

$$1.09 < di/f < 4.76 \tag{12b}$$

$$-216.67 < ff1/ff1gt < -19.00 \tag{13b}$$

$$3.00 < ff2/ff2gt < 50.00 \tag{14b}$$

$$0.82 < f1/f < 4.53 \tag{15b}$$

In the optical system according to each example, the distortion and the lateral chromatic aberration of the aberrations may be corrected by electric image processing. Thereby, the optical system can achieve to miniaturize the entire lens diameter and to satisfactory correct the chromatic aberration and the curvature of field in photographing at a closest distance while increasing the photographing magnification.

In the optical system according to each example, during focusing from infinity to a closest distance, the first focus lens unit may move to the image side and the second focus lens unit may move to the object side. Thereby, during focusing from infinity to a closest distance, the change in the angle of view during moving image photographing can be decreased while suppressing the curvature of field and the spherical aberration.

In the optical system according to each example, a fixed unit having a negative or a positive refractive power may be disposed between the first focus lens unit and the second focus lens unit. Thereby, the change in the angle of view during moving image photographing can be suppressed.

In the optical system according to each example, a concave lens may be disposed closest to the object. Thereby, when widening the angle of view, a size of a front lens can be suppressed.

In the optical system according to each example, the first lens unit and the second focus lens unit may be constituted of two or less lenses. Thereby, the chromatic aberration and the curvature of field in photographing at a closest distance of the optical system can be satisfactorily corrected in a wide range of object distances while reducing a size and a weight of the focusing unit.

Next, a detailed description will be given of the optical system according to each example.

The optical system according to Examples 1 to 3 and 7 includes, in order from the object side to the image side, a first lens unit B1 having a positive refractive power, a second lens unit B2 having a negative refractive power, a third lens unit B3 having a positive refractive power, and a fourth lens unit (final lens unit) B4 having a negative refractive power. During focusing from infinity to a closest distance, the first lens unit B1 and the fourth lens unit B4 are fixed, and the second lens unit B2 and the third lens unit B3 move to the image side and the object side, respectively.

The optical system according to Examples 4 and 8 includes, in order from the object side to the image side, a first lens unit B1 having a positive refractive power, a second lens unit B2 having a negative refractive power, a third lens unit B3 having a positive refractive power, and a fourth lens unit (final lens unit) B4 having a positive refractive power. During focusing from infinity to a closest distance, the first lens unit B1 and the fourth lens unit B4 are fixed, and the second lens unit B2 and the third lens unit B3 move to the image side and the object side, respectively.

The optical system according to Example 5 includes, in order from the object side to the image side, a first lens unit B1 having a positive refractive power, a second lens unit B2 having a negative refractive power, a third lens unit (intermediate lens unit) B3 having a positive refractive power, a fourth lens unit B4 having a positive refractive power, and a fifth lens unit (final lens unit) B5 having a negative refractive power. During focusing from infinity to a closest distance, the first lens unit B1 , the third lens unit B3, and the fifth lens unit B5 are fixed, and the second lens unit B2 and the forth lens unit B4 move to the image side and the object side, respectively.

The optical system according to Example 6 includes, in order from the object side to the image side, a first lens unit B1 having a positive refractive power, a second lens unit B2 having a negative refractive power, a third lens unit (intermediate lens unit) B3 having a negative refractive power, a fourth lens unit B4 having a positive refractive power, and a fifth lens unit (final lens unit) B5 having a negative refractive power. During focusing from infinity to a closest distance, the first lens unit B1, the third lens unit B3, and the fifth lens unit B5 are fixed, and the second lens unit B2 and the forth lens unit B4 move to the image side and the object side, respectively.

In the optical system according to each example, the aperture stop SP is disposed on the object side of the second lens unit B2, which is the first focus lens unit. In the optical system according to each example, the first focus lens unit consists of a single lens or one cemented lens, and the second focus lens unit consists of a single lens or one cemented lens.

Numerical examples 1 to 8 corresponding to Examples 1 to 8 will be shown below.

In the surface data according to each numerical example, r represents a radius of curvature of each optical surface, and d (mm) represents an axial distance (distance on the optical axis) between an m-th surface and an (m+1)th surface, where m is a surface number counted from the light incident side. Further, nd represents a refractive index of each optical element for the d-line, and vd represents an Abbe number of the optical element. The Abbe number vd of a certain material is expressed as follows, where Nd, NF, and NC are refractive indexes for the d-line (587.6 nm), the F-line (486.1 nm), and the C-line (656.3 nm) in the Fraunhofer line:

$$vd=(Nd-1)/(NF-NC)$$

In each numerical example, values of d, a focal length (mm), an F-number, and a half angle of view(°) are those when the optical system according to each example is focused on an object at infinity. "BF" (backfocus) is a distance on the optical axis from the final lens surface (lens surface closest to the image plane) to the paraxial image plane, which is expressed by an air converted length. An "overall lens length" is a length obtained by adding the backfocus to a distance on the optical axis from the frontmost lens surface (lens surface closest to the object) to the final surface of the optical system. The "lens unit" is not limited to a plurality of lenses, but may consist of a single lens.

When the optical surface is an aspherical surface, the symbol * is added to the right shoulder of the surface number. The aspherical shape is expressed as follows:

$$X=(h^2/R)/[1+\{1-(1+k)(h/R)^2\}^{1/2}A4 \times h^4+A6 \times h^6+A8 \times h^8+A10 \times h^{10}$$

where X is a displacement amount from the surface vertex in the optical axis direction, h is a height from the optical axis in the direction orthogonal to the optical axis, R is a paraxial radius of curvature, k is a conical constant, A4, A6, A8 and A10 are aspherical coefficients of each order. "e±XX" in each aspherical surface coefficient means "$\times 10^{\pm XX}$".

NUMERICAL EXAMPLE 1

| | UNIT mm SURFACE DATA | | | |
|---|---|---|---|---|
| Surface number | r | d | nd | vd |
| 1 | 43.023 | 1.50 | 1.49700 | 81.6 |
| 2 | 25.527 | 11.34 | | |
| 3 | 127.985 | 1.80 | 1.43700 | 95.1 |
| 4 | 36.531 | 9.07 | | |
| 5 | −98.026 | 2.00 | 1.80809 | 22.8 |

-continued

| | | | | |
|---|---|---|---|---|
| 6 | 136.852 | 7.01 | 1.88202 | 37.2 |
| 7* | −66.130 | 5.00 | | |
| 8 | 58.243 | 4.57 | 2.00069 | 25.5 |
| 9 | 460.112 | 2.00 | | |
| 10 | 100.000 | 10.00 | 1.43700 | 95.1 |
| 11 | −43.679 | 2.00 | 1.64769 | 33.8 |
| 12 | 29.025 | 4.00 | | |
| 13 | 38.101 | 11.74 | 1.55032 | 75.5 |
| 14 | −42.169 | 0.00 | | |
| 15 (aperture stop) | ∞ | (variable) | | |
| 16 | 207.159 | 1.50 | 1.43700 | 95.1 |
| 17 | 28.646 | (variable) | | |
| 18 | 30.139 | 7.17 | 1.72916 | 54.7 |
| 19 | −135.982 | (variable) | | |
| 20 | 74.384 | 2.00 | 1.90366 | 31.3 |
| 21 | 24.687 | 6.21 | 1.49700 | 81.6 |
| 22 | −500.000 | 10.48 | | |
| 23* | −25.008 | 1.50 | 1.49700 | 81.6 |
| 24* | −200.217 | 9.00 | | |
| 25 | ∞ | 1.60 | 1.51633 | 64.1 |
| 26 | ∞ | 1.00 | | |
| Image plane | ∞ | | | |

ASPHERIC DATA

Seventh surface

K = 0.00000e+000   A4 = 4.07224e−007   A6 = −3.23862e−010   A8 = −1.37380e−012

Twenty-third surface

K = 0.00000e+000   A4 = −4.16203e−005   A6 = 3.02674e−008   A8 = 5.33482e−011
A10 = −9.11642e−013

Twenty-fourth surface

K = 0.00000e+000   A4 = −1.05083e−005   A6 = 5.12526e−008

VARIOUS DATA

| | |
|---|---|
| Focal length | 35.00 |
| F-number | 1.42 |
| Half angle of view (°) | 31.73 |
| Image height | 21.64 |
| Overall lens length | 126.05 |
| BF | 11.06 |

| | | |
|---|---|---|
| d15 | 2.00 | 6.14 |
| d17 | 10.10 | 4.53 |
| d19 | 2.00 | 3.43 |

LENS UNIT DATA

| Unit | Starting Surface | Focal length |
|---|---|---|
| 1 | 1 | 49.51 |
| 2 | 16 | −76.27 |
| 3 | 18 | 34.46 |
| 4 | 20 | −47.41 |

Single lens data

| Lens | Starting Surface | Focal length |
|---|---|---|
| 1 | 1 | −130.00 |
| 2 | 3 | −117.69 |
| 3 | 5 | −70.41 |
| 4 | 6 | 51.38 |
| 5 | 8 | 66.26 |
| 6 | 10 | 71.07 |
| 7 | 11 | −26.64 |
| 8 | 13 | 38.36 |
| 9 | 16 | −76.27 |
| 10 | 18 | 34.46 |
| 11 | 20 | −41.68 |
| 12 | 21 | 47.52 |
| 13 | 23 | −57.67 |

-continued

| Cemented lens data | | |
|---|---|---|
| Lens | Starting Surface | Focal length |
| 1 | 5 | 162.78 |
| 2 | 10 | 45.56 |
| 3 | 20 | −320.94 |

NUMERICAL EXAMPLE 2

| UNIT mm SURFACE DATA | | | | |
|---|---|---|---|---|
| Surface number | r | d | nd | vd |
| 1 | 43.303 | 1.50 | 1.49700 | 81.6 |
| 2 | 25.628 | 11.44 | | |
| 3 | 144.477 | 1.80 | 1.43700 | 95.1 |
| 4 | 41.951 | 10.87 | | |
| 5 | −46.896 | 2.00 | 1.80809 | 22.8 |
| 6 | −187.790 | 6.24 | 1.88202 | 37.2 |
| 7* | −46.447 | 5.00 | | |
| 8 | 64.630 | 4.83 | 2.00069 | 25.5 |
| 9 | 2237.765 | 2.00 | | |
| 10 | 47.791 | 10.00 | 1.43700 | 95.1 |
| 11 | −47.724 | 2.00 | 1.64769 | 33.8 |
| 12 | 26.928 | 4.00 | | |
| 13 | 34.201 | 12.81 | 1.55032 | 75.5 |
| 14 | −42.224 | 0.00 | | |
| 15 (aperture stop) | ∞ | (variable) | | |
| 16 | −93.126 | 1.50 | 1.43700 | 95.1 |
| 17 | 28.404 | (variable) | | |
| 18 | 29.480 | 6.58 | 1.72916 | 54.7 |
| 19 | −264.088 | (variable) | | |
| 20 | 52.371 | 2.00 | 1.90366 | 31.3 |
| 21 | 22.025 | 7.25 | 1.49700 | 81.6 |
| 22 | −163.027 | 10.69 | | |
| 23* | −23.935 | 1.50 | 1.49700 | 81.6 |
| 24* | −129.318 | 9.00 | | |
| 25 | ∞ | 1.60 | 1.51680 | 64.2 |
| 26 | ∞ | 1.00 | | |
| Image plane | ∞ | | | |

| ASPHERIC DATA |
|---|
| Seventh surface |
| K = 0.00000e+000  A4 = 2.44903e−007    A6 = −8.29651e−011    A8 = −8.90510e−013 |
| Twenty-third surface |
| K = 0.00000e+000  A4 = −3.66710e−005    A6 = −1.67345e−008    A8 = 4.66714e−010<br>A10 = −2.30327e−012 |
| Twenty-fourth surface |
| K = 0.00000e+000  A 4 = −1.08363e−005    A6 = 5.27693e−008 |

| VARIOUS DATA | |
|---|---|
| Focal length | 35.00 |
| F-number | 1.42 |
| Half angle of view (°) | 31.72 |
| Image height | 21.64 |
| Overall lens length | 128.31 |
| BF | 11.06 |

| | | |
|---|---|---|
| d15 | 2.00 | 5.97 |
| d17 | 9.24 | 4.27 |
| d19 | 2.00 | 3.00 |

| LENS UNIT DATA | | |
|---|---|---|
| Unit | Starting Surface | Focal length |
| 1 | 1 | 39.61 |
| 2 | 16 | −49.62 |

| | | |
|---|---|---|
| 3 | 18 | 36.72 |
| 4 | 20 | −70.93 |

| Single lens data | | |
|---|---|---|
| Lens | Starting Surface | Focal length |
| 1 | 1 | −130.00 |
| 2 | 3 | −136.01 |
| 3 | 5 | −77.84 |
| 4 | 6 | 68.55 |
| 5 | 8 | 66.43 |
| 6 | 10 | 56.44 |
| 7 | 11 | −26.30 |
| 8 | 13 | 36.51 |
| 9 | 16 | −49.62 |
| 10 | 18 | 36.72 |
| 11 | 20 | −43.42 |
| 12 | 21 | 39.56 |
| 13 | 23 | −59.38 |

| Cemented lens data | | |
|---|---|---|
| Lens | Starting Surface | Focal length |
| 1 | 5 | 353.37 |
| 2 | 10 | −57.58 |
| 3 | 20 | 468.89 |

NUMERICAL EXAMPLE 3

| UNIT mm SURFACE DATA | | | | |
|---|---|---|---|---|
| Surface number | r | d | nd | vd |
| 1 | 39.599 | 1.50 | 1.49700 | 81.6 |
| 2 | 23.672 | 10.98 | | |
| 3 | 111.506 | 1.80 | 1.43700 | 95.1 |
| 4 | 33.322 | 8.78 | | |
| 5 | −93.458 | 2.00 | 1.80809 | 22.8 |
| 6 | 76.200 | 7.84 | 1.88202 | 37.2 |
| 7* | −62.833 | 5.00 | | |
| 8 | 55.907 | 4.63 | 2.00069 | 25.5 |
| 9 | 357.068 | 2.00 | | |
| 10 | 81.457 | 10.00 | 1.43700 | 95.1 |
| 11 | −44.693 | 2.00 | 1.64769 | 33.8 |
| 12 | 38.769 | 4.00 | | |
| 13 | 504.887 | 7.66 | 1.55032 | 75.5 |
| 14 | −34.964 | 0.00 | | |
| 15 (aperture stop) | ∞ | (variable) | | |
| 16 | 81.785 | 1.50 | 1.43700 | 95.1 |
| 17 | 32.826 | (variable) | | |
| 18 | 28.620 | 7.29 | 1.72916 | 54.7 |
| 19 | −133.218 | (variable) | | |
| 20 | 137.450 | 2.00 | 1.90366 | 31.3 |
| 21 | 26.368 | 6.22 | 1.49700 | 81.6 |
| 22 | −500.000 | 10.43 | | |
| 23* | −26.788 | 1.50 | 1.49700 | 81.6 |
| 24* | −121.313 | 9.00 | | |
| 25 | ∞ | 1.60 | 1.51680 | 64.2 |
| 26 | ∞ | 1.00 | | |
| Image plane | ∞ | | | |

| ASPHERIC DATA |
|---|
| Seventh surface |

K = 0.00000e+000    A4 = 4.36001e−007    A6 = −2.06434e−010    A8 = −2.27754e−012

Twenty-third surface

K = 0.00000e+000    A4 = −5.16339e−005    A6 = 4.44293e−008    A8 = −2.54784e−011
A10 = −7.78807e−013

Twenty-fourth surface

K = 0.00000e+000    A4 = −1.58598e−005    A6 = 7.37115e−008

VARIOUS DATA

| | |
|---|---|
| Focal length | 34.99 |
| F-number | 1.43 |
| Half angle of view (°) | 31.73 |
| Image height | 21.64 |
| Overall lens length | 123.63 |
| BF | 11.06 |

| | | | |
|---|---|---|---|
| d15 | 2.00 | | 8.25 |
| d17 | 11.44 | | 3.80 |
| d19 | 2.00 | | 3.39 |

LENS UNIT DATA

| Unit | Starting Surface | Focal length |
|---|---|---|
| 1 | 1 | 63.03 |
| 2 | 16 | −126.66 |
| 3 | 18 | 32.94 |
| 4 | 20 | −42.29 |

Single lens data

| Lens | Starting Surface | focal length |
|---|---|---|
| 1 | 1 | −122.24 |
| 2 | 3 | −109.52 |
| 3 | 5 | −51.67 |
| 4 | 6 | 40.10 |
| 5 | 8 | 65.73 |
| 6 | 10 | 67.67 |
| 7 | 11 | −31.75 |
| 8 | 13 | 59.72 |
| 9 | 16 | −126.66 |
| 10 | 18 | 32.94 |
| 11 | 20 | −36.42 |
| 12 | 21 | 50.60 |
| 13 | 23 | −69.54 |

Cemented lens data

| Lens | Starting Surface | Focal length |
|---|---|---|
| 1 | 5 | 143.82 |
| 2 | 10 | −65.62 |
| 3 | 20 | −129.56 |

NUMERICAL EXAMPLE 4

UNIT mm
SURFACE DATA

| Surface number | r | d | nd | vd |
|---|---|---|---|---|
| 1 | 76.928 | 1.50 | 1.49700 | 81.6 |
| 2 | 24.596 | 12.35 | | |
| 3 | −2212.760 | 1.80 | 1.43700 | 95.1 |
| 4 | 29.702 | 9.88 | | |
| 5 | −68.477 | 2.00 | 1.80809 | 22.8 |
| 6 | 532.444 | 7.03 | 1.88202 | 37.2 |
| 7* | −44.391 | 5.00 | | |
| 8 | 53.281 | 4.03 | 2.00069 | 25.5 |
| 9 | 263.646 | 2.00 | | |
| 10 | 100.000 | 10.00 | 1.43700 | 95.1 |
| 11 | −40.000 | 2.00 | 1.64769 | 33.8 |
| 12 | 26.278 | 4.00 | | |
| 13 | 35.528 | 11.19 | 1.55032 | 75.5 |
| 14 | −35.595 | 0.00 | | |
| 15 (aperture stop) | ∞ | (variable) | | |

-continued

| | | | | |
|---|---|---|---|---|
| 16 | 52.686 | 1.50 | 1.43700 | 95.1 |
| 17 | 31.790 | (variable) | | |
| 18 | 36.504 | 3.53 | 1.72916 | 54.7 |
| 19 | 81.010 | (variable) | | |
| 20 | 50.233 | 2.00 | 1.90366 | 31.3 |
| 21 | 26.769 | 6.71 | 1.49700 | 81.6 |
| 22 | −53.166 | 11.32 | | |
| 23* | −40.000 | 1.50 | 1.49700 | 81.6 |
| 24* | −2000.000 | 9.00 | | |
| 25 | ∞ | 1.60 | 1.51680 | 64.2 |
| 26 | ∞ | 1.00 | | |
| Image plane | ∞ | | | |

ASPHERIC DATA

Seventh surface

| | | | |
|---|---|---|---|
| K = 0.00000e+000 | A4 = 5.71246e−007 | A6 = 1.21825e−010 | A8 = −4.21716e−012 |

Twenty-third surface

| | | | |
|---|---|---|---|
| K = 0.00000e+000 | A4 = −4.98667e−005 | A6 = 1.03329e−007 | A8 = −1.12065e−010 |
| A10 = 1.11400e−013 | | | |

Twenty-fourth surface

| | | |
|---|---|---|
| K = 0.00000e+000 | A4 = −1.40628e−005 | A6 = 6.57763e−008 |

VARIOUS DATA

| | | |
|---|---|---|
| Focal length | 24.17 | |
| F-number | 1.42 | |
| Half angle of view (°) | 41.83 | |
| Image height | 21.64 | |
| Overall lens length | 124.64 | |
| BF | 11.06 | |
| d15 | 2.00 | 7.11 |
| d17 | 10.26 | 3.16 |
| d19 | 2.00 | 3.99 |

LENS UNIT DATA

| Unit | Starting Surface | Focal length |
|---|---|---|
| 1 | 1 | 39.59 |
| 2 | 16 | −187.51 |
| 3 | 18 | 88.18 |
| 4 | 20 | 495.05 |

Single lens data

| Lens | Starting Surface | Focal length |
|---|---|---|
| 1 | 1 | −73.45 |
| 2 | 3 | −67.05 |
| 3 | 5 | −74.97 |
| 4 | 6 | 46.72 |
| 5 | 8 | 66.10 |
| 6 | 10 | 66.83 |
| 7 | 11 | −24.20 |
| 8 | 13 | 34.22 |
| 9 | 16 | −187.51 |
| 10 | 18 | 88.18 |
| 11 | 20 | −66.09 |
| 12 | 21 | 36.85 |
| 13 | 23 | −82.15 |

Cemented lens data

| Lens | Starting Surface | Focal length |
|---|---|---|
| 1 | 5 | 107.13 |
| 2 | 10 | −40.56 |
| 3 | 20 | 82.46 |

NUMERICAL EXAMPLE 5

UNIT mm
SURFACE DATA

| Surface number | r | d | nd | νd |
|---|---|---|---|---|
| 1 | 47.010 | 1.50 | 1.49700 | 81.6 |
| 2 | 25.590 | 11.07 | | |
| 3 | 109.995 | 1.80 | 1.43700 | 95.1 |
| 4 | 36.419 | 9.37 | | |
| 5 | −90.527 | 2.00 | 1.80809 | 22.8 |
| 6 | 164.057 | 7.12 | 1.88202 | 37.2 |
| 7* | −60.791 | 5.00 | | |
| 8 | 57.315 | 4.48 | 2.00069 | 25.5 |
| 9 | 391.159 | 2.00 | | |
| 10 | 100.000 | 10.00 | 1.43700 | 95.1 |
| 11 | −41.968 | 2.00 | 1.64769 | 33.8 |
| 12 | 27.569 | 4.00 | | |
| 13 | 36.353 | 11.18 | 1.55032 | 75.5 |
| 14 | −40.889 | 0.00 | | |
| 15 (aperture stop) | ∞ | (variable) | | |
| 16 | 558.717 | 1.50 | 1.43700 | 95.1 |
| 17 | 28.738 | (variable) | | |
| 18 | 110.574 | 2.11 | 1.70998 | 55.6 |
| 19 | 271.607 | (variable) | | |
| 20 | 31.385 | 6.77 | 1.72916 | 54.7 |
| 21 | −100.117 | (variable) | | |
| 22 | 98.392 | 2.00 | 1.90366 | 31.3 |
| 23 | 24.659 | 6.28 | 1.49700 | 81.6 |
| 24 | −500.000 | 9.17 | | |
| 25* | −28.962 | 1.50 | 1.49700 | 81.6 |
| 26* | −2000.000 | 9.00 | | |
| 27 | ∞ | 1.60 | 1.51680 | 64.2 |
| 28 | ∞ | 1.00 | | |
| Image plane | ∞ | | | |

ASPHERIC DATA

Seventh surface

K = 0.00000e+000   A4 = 4.40686e−007   A6 = −2.79017e−010   A8 = −1.60201e−012

Twenty-fifth surface

K = 0.00000e+000   A4 = −4.94338e−005   A6 = 6.81113e−008   A8 = −1.44200e−010
A10 = −1.20663e−013

Twenty-sixth surface

K = 0.00000e+000   A4 = −1.30110e−005   A6 = 6.14004e−008

VARIOUS DATA

| | | |
|---|---|---|
| Focal length | 33.11 | |
| F-number | 1.42 | |
| Half angle of view (°) | 33.17 | |
| Image height | 21.64 | |
| Overall lens length | 126.01 | |
| BF | 11.06 | |
| d15 | 2.00 | 5.81 |
| d17 | 7.96 | 4.15 |
| d19 | 2.14 | 1.00 |
| d21 | 2.00 | 3.14 |

LENS UNIT DATA

| Unit | Starting Surface | Focal length |
|---|---|---|
| 1 | 1 | 47.88 |
| 2 | 16 | −69.39 |
| 3 | 18 | 261.27 |
| 4 | 20 | 33.50 |
| 5 | 22 | −41.09 |

Single lens data

| Lens | Starting Surface | Focal length |
|---|---|---|
| 1 | 1 | −115.69 |
| 2 | 3 | −125.52 |

-continued

| | | |
|---|---|---|
| 3 | 5 | −71.94 |
| 4 | 6 | 51.05 |
| 5 | 8 | 66.66 |
| 6 | 10 | 69.13 |
| 7 | 11 | −25.40 |
| 8 | 13 | 36.86 |
| 9 | 16 | −69.39 |
| 10 | 18 | 261.27 |
| 11 | 20 | 33.50 |
| 12 | 22 | −36.89 |
| 13 | 23 | 47.47 |
| 14 | 25 | −59.15 |

Cemented lens data

| Lens | Starting Surface | Focal length |
|---|---|---|
| 1 | 5 | 150.47 |
| 2 | 10 | −42.94 |
| 3 | 22 | −163.04 |

NUMERICAL EXAMPLE 6

UNIT mm
SURFACE DATA

| Surface number | r | d | nd | vd |
|---|---|---|---|---|
| 1 | 47.746 | 1.50 | 1.49700 | 81.6 |
| 2 | 25.623 | 10.83 | | |
| 3 | 107.955 | 1.80 | 1.43700 | 95.1 |
| 4 | 35.548 | 9.51 | | |
| 5 | −87.859 | 2.00 | 1.80809 | 22.8 |
| 6 | 156.235 | 7.04 | 1.88202 | 37.2 |
| 7* | −62.326 | 5.00 | | |
| 8 | 59.857 | 4.67 | 2.00069 | 25.5 |
| 9 | 1193.743 | 2.00 | | |
| 10 | 100.000 | 10.00 | 1.43700 | 95.1 |
| 11 | −40.516 | 2.00 | 1.64769 | 33.8 |
| 12 | 27.849 | 4.00 | | |
| 13 | 36.549 | 11.35 | 1.55032 | 75.5 |
| 14 | −40.774 | 0.00 | | |
| 15 (aperture stop) | ∞ | (variable) | | |
| 16 | 166.566 | 1.50 | 1.43700 | 95.1 |
| 17 | 28.018 | (variable) | | |
| 18 | 57.294 | 1.50 | 1.63294 | 27.0 |
| 19 | 52.329 | (variable) | | |
| 20 | 29.695 | 6.73 | 1.72916 | 54.7 |
| 21 | −126.555 | (variable) | | |
| 22 | 79.881 | 2.00 | 1.90366 | 31.3 |
| 23 | 25.795 | 6.53 | 1.49700 | 81.6 |
| 24 | −148.948 | 9.21 | | |
| 25* | −26.185 | 1.50 | 1.49700 | 81.6 |
| 26* | −2000.000 | 9.00 | | |
| 27 | ∞ | 1.60 | 1.51680 | 64.2 |
| 28 | ∞ | 1.00 | | |
| Image plane | ∞ | | | |

ASPHERIC DATA

Seventh surface

K = 0.00000e+000   A4 = 4.58372e−007   A6 = −3.17739e−010   A8 = −1.64377e−012

Twenty-fifth surface

K = 0.00000e+000   A4 = −4.66934e−005   A6 = 5.30650e−008   A8 = −2.76179e−011
A10 = −7.80993e−013

Twenty-sixth surface

K = 0.00000e+000   A4 = −1.21546e−005   A6 = 5.78331e−008

-continued

VARIOUS DATA

| | | |
|---|---|---|
| Focal length | 33.03 | |
| F-NUMBER | 1.42 | |
| Half angle of view (°) | 33.23 | |
| Image height | 21.64 | |
| Overall lens length | 125.39 | |
| BF | 11.06 | |
| d15 | 2.00 | 5.67 |
| d17 | 6.96 | 3.29 |
| d19 | 2.70 | 1.34 |
| d21 | 2.00 | 3.36 |

LENS UNIT DATA

| Unit | Starting Surface | Focal length |
|---|---|---|
| 1 | 1 | 46.87 |
| 2 | 16 | −77.34 |
| 3 | 18 | −1080.47 |
| 4 | 20 | 33.60 |
| 5 | 22 | −50.21 |

Single lens data

| Lens | Starting Surface | Focal length |
|---|---|---|
| 1 | 1 | −113.83 |
| 2 | 3 | −122.21 |
| 3 | 5 | −69.34 |
| 4 | 6 | 51.29 |
| 5 | 8 | 62.84 |
| 6 | 10 | 67.44 |
| 7 | 11 | −25.19 |
| 8 | 13 | 36.95 |
| 9 | 16 | −77.34 |
| 10 | 18 | −1080.47 |
| 11 | 20 | 33.60 |
| 12 | 22 | −42.91 |
| 13 | 23 | 44.80 |
| 14 | 25 | −53.40 |

Cemented lens data

| Lens | Starting Surface | focal length |
|---|---|---|
| 1 | 5 | 165.62 |
| 2 | 10 | −43.03 |
| 3 | 22 | −1103.96 |

NUMERICAL EXAMPLE 7

UNIT mm
SURFACE DATA

| Surface number | r | d | nd | vd |
|---|---|---|---|---|
| 1 | 106.276 | 1.50 | 1.49700 | 81.6 |
| 2 | 25.580 | 7.86 | | |
| 3 | 95.325 | 1.80 | 1.43700 | 95.1 |
| 4 | 40.096 | 6.29 | | |
| 5 | −223.029 | 2.00 | 1.80809 | 22.8 |
| 6 | 57.287 | 8.09 | 1.88202 | 37.2 |
| 7* | −73.311 | 5.00 | | |
| 8 | 56.012 | 4.11 | 2.00069 | 25.5 |
| 9 | 167.028 | 2.00 | | |
| 10 | 100.000 | 10.00 | 1.43700 | 95.1 |
| 11 | −48.284 | 2.00 | 1.64769 | 33.8 |
| 12 | 38.540 | 4.00 | | |
| 13 | 69.805 | 10.00 | 1.55032 | 75.5 |
| 14 | −39.476 | 0.00 | | |
| 15 (aperture stop) | ∞ | (variable) | | |
| 16 | 49.958 | 2.98 | 1.95906 | 17.5 |
| 17 | 100.000 | 1.50 | 1.78466 | 29.9 |

-continued

| | | | | |
|---|---|---|---|---|
| 18 | 28.757 | (variable) | | |
| 19 | 29.200 | 7.47 | 1.72916 | 54.7 |
| 20 | −102.920 | (variable) | | |
| 21 | 123.941 | 2.00 | 1.90366 | 31.3 |
| 22 | 22.966 | 7.08 | 1.49700 | 81.6 |
| 23 | −500.000 | 9.25 | | |
| 24* | −25.629 | 1.50 | 1.49700 | 81.6 |
| 25* | −148.405 | 9.00 | | |
| 26 | ∞ | 1.60 | 1.51680 | 64.2 |
| 27 | ∞ | 1.00 | | |
| Image plane | ∞ | | | |

ASPHERIC DATA

Seventh surface $K = 0.00000e+000$  $A4 = 3.78728e-007$  $A6 = -4.04098e-010$  $A8 = -1.55464e-012$

Twenty-fourth surface $K = 0.00000e+000$  $A4 = -3.64515e-005$  $A6 = -4.06368e-008$  $A8 = 3.81507e-010$
$A10 = -2.29968e-012$

Twenty-fifth surface $K = 0.00000e+000$  $A4 = -6.18765e-006$  $A6 = 3.33660e-008$

VARIOUS DATA

| | | |
|---|---|---|
| Focal length | 34.99 | |
| F-NUMBER | 1.43 | |
| Half angle of view (°) | 31.73 | |
| Image height | 21.64 | |
| Overall lens length | 122.18 | |
| BF | 11.06 | |
| d15 | 2.00 | 6.92 |
| d18 | 10.71 | 4.44 |
| d20 | 2.00 | 3.35 |

LENS UNIT DATA

| Unit | Starting Surface | Focal length |
|---|---|---|
| 1 | 1 | 58.06 |
| 2 | 16 | −116.49 |
| 3 | 19 | 31.96 |
| 4 | 21 | −36.75 |

Single lens data

| Lens | Starting Surface | Focal length |
|---|---|---|
| 1 | 1 | −68.20 |
| 2 | 3 | −159.95 |
| 3 | 5 | −56.22 |
| 4 | 6 | 37.55 |
| 5 | 8 | 82.69 |
| 6 | 10 | 76.07 |
| 7 | 11 | −32.79 |
| 8 | 13 | 47.36 |
| 9 | 16 | 101.15 |
| 10 | 17 | −51.92 |
| 11 | 19 | 31.96 |
| 12 | 21 | −31.49 |
| 13 | 22 | 44.38 |
| 14 | 24 | −62.59 |

Cemented lens data

| Lens | Starting Surface | Focal length |
|---|---|---|
| 1 | 5 | 101.30 |
| 2 | 10 | −61.91 |
| 3 | 16 | −116.49 |
| 4 | 21 | −108.16 |

NUMERICAL EXAMPLE 8

UNIT mm
SURFACE DATA

| Surface number | r | d | nd | νd |
|---|---|---|---|---|
| 1 | 65.579 | 1.50 | 1.49700 | 81.6 |
| 2 | 23.000 | 12.46 | | |
| 3 | −662.124 | 1.80 | 1.43700 | 95.1 |
| 4 | 28.061 | 9.97 | | |
| 5 | −50.605 | 2.00 | 1.80809 | 22.8 |
| 6 | 381.347 | 7.33 | 1.88202 | 37.2 |
| 7* | −40.191 | 5.00 | | |
| 8 | 62.149 | 3.88 | 2.00069 | 25.5 |
| 9 | 3570.991 | 2.00 | | |
| 10 | 100.000 | 10.00 | 1.43700 | 95.1 |
| 11 | −40.000 | 2.00 | 1.64769 | 33.8 |
| 12 | 26.371 | 4.00 | | |
| 13 | 34.786 | 10.00 | 1.55032 | 75.5 |
| 14 | −36.672 | 0.00 | | |
| 15 (aperture stop) | ∞ | (variable) | | |
| 16 | 41.200 | 3.00 | 1.95906 | 17.5 |
| 17 | 100.000 | 1.50 | 1.69369 | 23.7 |
| 18 | 26.956 | (variable) | | |
| 19 | 65.399 | 1.50 | 1.81328 | 19.9 |
| 20 | 34.046 | 4.70 | 1.72916 | 54.7 |
| 21 | −123.693 | (variable) | | |
| 22 | 111.407 | 1.50 | 1.90366 | 31.3 |
| 23 | 51.623 | 5.90 | 1.49700 | 81.6 |
| 24 | −61.553 | 6.18 | | |
| 25* | −60.532 | 1.50 | 1.49700 | 81.6 |
| 26* | −2000.000 | 9.00 | | |
| 27 | ∞ | 1.60 | 1.51680 | 64.2 |
| 28 | ∞ | 1.00 | | |
| Image plane | ∞ | | | |

ASPHERIC DATA

Seventh surface $K = 0.00000e+000$  $A4 = 6.43021e-007$  $A6 = 7.39214e-011$  $A8 = -5.57224e-012$ Twenty-fifth surface $K = 0.00000e+000$  $A4 = -6.56028e-005$  $A6 = 1.75805e-007$  $A8 = 1.95029e-010$
$A10 = -7.55772e-013$ Twenty-sixth surface $K = 0.00000e+000$  $A4 = -4.27544e-005$  $A6 = 1.79627e-007$

VARIOUS DATA

| | | |
|---|---|---|
| Focal length | 22.00 | |
| F-NUMBER | 1.42 | |
| Half angle of view (°) | 44.52 | |
| Image height | 21.64 | |
| Overall lens length | 125.60 | |
| BF | 11.06 | |
| d15 | 2.00 | 4.93 |
| d18 | 10.40 | 5.47 |
| d21 | 4.40 | 6.40 |

LENS UNIT DATA

| Unit | Starting Surface | Focal length |
|---|---|---|
| 1 | 1 | 38.75 |
| 2 | 16 | −275.78 |
| 3 | 19 | 63.84 |
| 4 | 22 | 1243.49 |

Single lens data

| Lens | Starting Surface | Focal length |
|---|---|---|
| 1 | 1 | −72.12 |
| 2 | 3 | −61.55 |
| 3 | 5 | −55.17 |
| 4 | 6 | 41.56 |

-continued

| | | |
|---|---|---|
| 5 | 8 | 63.17 |
| 6 | 10 | 66.83 |
| 7 | 11 | −24.25 |
| 8 | 13 | 34.13 |
| 9 | 16 | 71.28 |
| 10 | 17 | −53.65 |
| 11 | 19 | −89.23 |
| 12 | 20 | 37.08 |
| 13 | 22 | −107.74 |
| 14 | 23 | 57.49 |
| 15 | 25 | −125.63 |

Cemented lens data

| Lens | Starting Surface | Focal length |
|---|---|---|
| 1 | 5 | 126.41 |
| 2 | 10 | −40.69 |
| 3 | 16 | −275.78 |
| 4 | 19 | 63.84 |
| 5 | 22 | 120.51 |

Tables 1 and 2 below summarize various values in each numerical example.

TABLE 1

| | Example 1 | Example 2 | Example 3 | Example 4 |
|---|---|---|---|---|
| ① ff2/ff1 | −0.452 | −0.740 | −0.260 | −0.470 |
| ② ff2/bf | 3.117 | 3.321 | 2.979 | 7.976 |
| ③ f/x1 | 0.648 | 0.650 | 0.621 | 0.466 |
| ④ ff1/f | −2.179 | −1.418 | −3.620 | −7.757 |
| ⑤ ff2/f | 0.985 | 1.043 | 0.941 | 3.648 |
| ⑥ f/y | 1.618 | 1.618 | 1.617 | 1.117 |
| ⑦ sfff1 | 1.321 | 0.533 | 2.341 | 4.043 |
| ⑧ sfff2 | −0.637 | −0.799 | −0.646 | −2.640 |
| ⑨ Bff1/Bff2 | 29.065 | 119.026 | 14.670 | 2.951 |
| ⑩ ffrn/f | −1.648 | −1.697 | −1.987 | −3.398 |
| ⑪ Mff1/Mff2 | −2.9008 | −3.970 | −4.464 | −2.564 |
| ⑫ di/f | 1.430 | 1.438 | 1.484 | 2.001 |
| ⑬ ff1/ff1gt | −50.845 | −33.031 | −84.442 | −125.009 |
| ⑭ ff2/ff2gt | 4.806 | 5.582 | 4.517 | 25.000 |
| ⑮ f1/f | 1.415 | 1.132 | 1.801 | 1.638 |

TABLE 2

| | Example 5 | Example 6 | Example 7 | Example 8 |
|---|---|---|---|---|
| ① ff2/ff1 | −0.483 | −0.484 | −0.274 | −0.231 |
| ② ff2/bf | 3.030 | 3.039 | 2.891 | 5.774 |
| ③ f/x1 | 0.608 | 0.615 | 0.608 | 0.410 |
| ④ ff1/f | −2.096 | −2.341 | −3.330 | −12.535 |
| ⑤ ff2/f | 1.012 | 1.017 | 0.913 | 2.902 |
| ⑥ f/y | 1.530 | 1.527 | 1.617 | 1.017 |
| ⑦ sfff1 | 1.108 | 1.404 | 1.807 | 1.738 |
| ⑧ sfff2 | −0.523 | −0.620 | −0.558 | −0.568 |
| ⑨ Bff1/Bff2 | 11.404 | 26.568 | 13.109 | 2.443 |
| ⑩ ffrn/f | −1.787 | −1.617 | −1.789 | −5.710 |
| ⑪ Mff1/Mff2 | −3.634 | −2.691 | −3.648 | −1.466 |
| ⑫ di/f | 1.540 | 1.520 | 1.459 | 2.143 |
| ⑬ ff1/ff1gt | −46.288 | −51.558 | −26.028 | −61.303 |
| ⑭ ff2/ff2gt | 4.960 | 4.988 | 4.279 | 10.295 |
| ⑮ f1/f | 1.448 | 1.419 | 1.659 | 1.761 |

IMAGING APPARATUS

Figure 25:
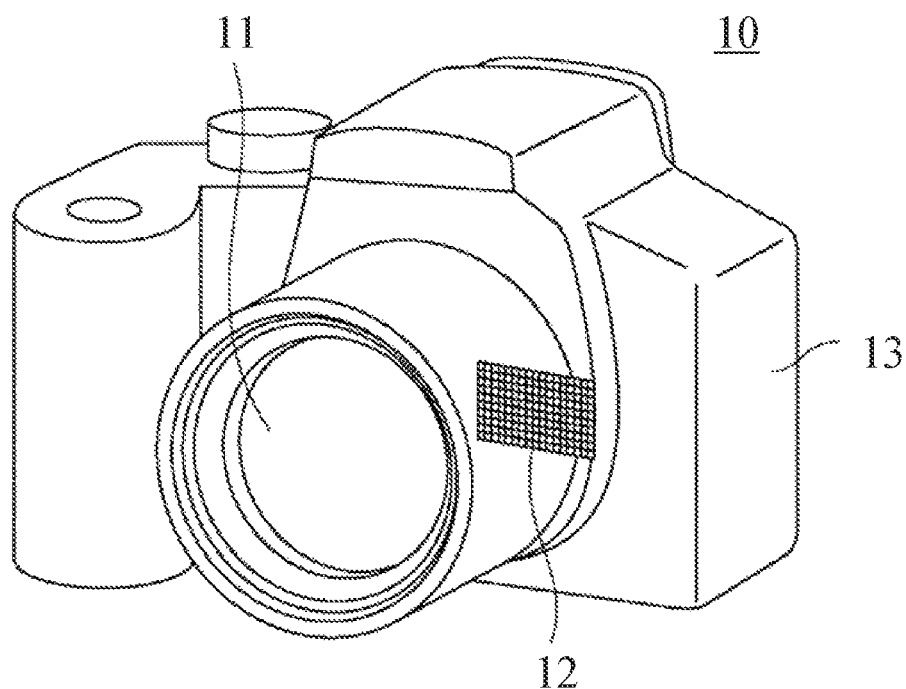
FIG. 25 is a schematic diagram of an imaging apparatus.

Referring now to FIG. 25, a description will be given of an illustrative digital still camera (imaging pickup apparatus) using an optical system of the present invention as an imaging optical system. In FIG. 25, reference numeral 10 denotes a camera body, and reference numeral 11 denotes an imaging optical system including any of the optical system according to Examples 1 to 8. Reference numeral 12 denotes a solid state image sensor (photoelectric conversion element) such as a CCD sensor or a CMOS sensor which is built in the camera body 12 and receives an optical image formed by the imaging optical system 11 and photoelectrically converts it. The camera body 10 may be a so-called single lens reflex camera having a quick turn mirror or a so-called mirrorless camera having no quick turn mirror.

By thus applying the optical system of the present invention to the imaging apparatus such as the digital still camera, an imaging apparatus having a small lens can be acquired.

IMAGING SYSTEM

An imaging system (surveillance camera system) including an optical system according to each example and a control unit that controls the optical system may be configured. In this case, the control unit can control the optical system so that each lens unit moves as described above during zooming, focusing, and image shake correction. At this time, the control unit does not have to be configured integrally with the optical system and may be configured separately from the optical system. For example, a configuration may be adopted in which a control unit (control device) arranged far from a drive unit that drives each lens of the optical system includes a transmission unit that sends a control signal (command) for controlling the optical system. With such a control unit, the optical system can be operated remotely.

Further, a configuration may be adopted in which an operating unit such as a controller or a button for remotely operating the optical system is provided in the control unit to control the optical system according to an input to the operating unit by the user. For example, an enlargement button and a reduction button are provided as the operation unit, and the control unit may send a signal to the drive unit of the optical system so that the optical system magnification is increased when the user presses the enlargement button and the optical system magnification is reduced when the user presses the reduction button.

Further, the imaging system may have a display unit such as a liquid crystal panel that displays information regarding a focusing position of the optical system (moving state of a focus lens). The information regarding the focusing position of the optical system is, for example, an object distance. In this case, the user can remotely operate the optical system via the operation unit while viewing the information regarding the focusing position of the optical system displayed on the display unit. At this time, the display unit and the operation unit may be integrated by adopting, for example, a touch panel.

According to the above-described embodiment, it is possible to provide an optical system that miniaturizes a focusing unit and can satisfactorily correct the chromatic aberration in a wide range of object distances, and an imaging apparatus and an imaging system having the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No.2020-006584, filed on Jan. 20, 2020 which is hereby incorporated by reference herein in its entirety.

What is claimed is:

1. An optical system comprising, in order from an object side to an image side:
   a first lens unit having a positive refractive power;
   a first focus lens unit having a negative refractive power; and
   a second focus lens unit having a positive refractive power,
   wherein the first lens unit is fixed during focusing,
   wherein the first focus lens unit and the second focus lens unit move so that a distance between the first focus lens unit and the second focus lens unit changes during focusing,
   wherein the first lens unit includes a single lens which is disposed closest to an object and has a negative refractive power, and
   wherein the following inequality is satisfied:

$$2.20 < f\!f2/bf < 12.00$$

where ff2 is a focal length of the second focus lens unit, and bf is a back focus of the optical system.

2. The optical system according to claim 1, further comprising an aperture stop,
   wherein the optical system has a fixed focal length, and
   wherein the following inequality is satisfied:

$$0.10 < f/x1 < 2.00$$

where f is a focal length of the optical system, and x1 is a distance on an optical axis from the aperture stop to an image plane when focused on an object at infinity.

3. The optical system according to claim 1,
   wherein the optical system has a fixed focal length, and
   wherein the following inequality is satisfied:

$$-40.00 < f\!f1/f < -0.20$$

where f is a focal length of the optical system and ff1 is a focal length of the first focus lens unit.

4. The optical system according to claim 1,
   wherein the optical system has a fixed focal length, and
   wherein the following inequality is satisfied:

$$0.20 < f\!f2/f < 15.00$$

where f is a focal length of the optical system.

5. The optical system according to claim 1,
   wherein the optical system has a fixed focal length, and
   wherein the following inequality is satisfied:

$$20 < f/y < 8.00$$

where f is a focal length of the optical system, and y is a radius of an image circle.

6. The optical system according to claim 1, wherein the following inequality is satisfied:

$$0.10 < sf\!f\!f1 < 20.00$$

where sfff1 is a shape factor of a negative lens having the largest refractive power among negative lenses included in the first focus lens unit.

7. The optical system according to claim 1, wherein the following inequality is satisfied:

$$-12.0 < sf\!f\!f2 < -0.10$$

where sfff2 is a shape factor of a positive lens having the largest refractive power among positive lenses included in the second focus lens unit.

8. The optical system according to claim 1, wherein the following inequality is satisfied:

$$0.50 < \beta f\!f1/\beta f\!f2 < 400.0$$

where βff1 is a lateral magnification of the first focus lens unit when focused on an object at infinity, and βff2 is a lateral magnification of the second focus lens unit when focused on an object at infinity.

9. The optical system according to claim 1,
   wherein the optical system has a fixed focal length, and
   wherein the following inequality is satisfied:

$$-25.00 < f\!f\!rn/f < -0.40$$

where ffrn is a focal length of a negative lens having the largest refractive power among negative lenses disposed between the second focus lens unit and an image plane, and f is a focal length of the optical system.

10. The optical system according to claim 1, wherein the following inequality is satisfied:

$$-20.00 < Mf\!f1/Mf\!f2 < -0.30$$

where, when setting a moving direction from the object side to the image side as positive, Mff1 is a relative moving quantity of the first focus lens unit to an image plane during focusing from infinity to a closest distance, and Mff2 is a relative moving quantity of the second focus lens unit to the image plane during focusing from infinity to a closest distance.

11. The optical system according to claim 1,
   wherein the optical system has a fixed focal length, and
   wherein the following inequality is satisfied:

$$0.40 < di/f < 10.00$$

where di is a distance on an optical axis from a surface closest to an image of the first focus lens unit to an image plane when focus on an object at infinity, and f is a focal length of the optical system.

12. The optical system according to claim 1, wherein the following inequality is satisfied:

$$-400.00 < f\!f1/f\!f1gt < -5.00$$

where ff1gt is a distance on an optical axis from a surface closest to an object of the first focus lens unit to a surface closest to an image of the first focus lens unit and ff1 is a focal length of the first focus lens unit.

13. The optical system according to claim 1, wherein the following inequality is satisfied:

$$1.00 < ff2/ff2gt < 100.00$$

where ff2gt is a distance on an optical axis from a surface closest to an object of the second focus lens unit to a surface closest to an image of the second focus lens unit.

14. The optical system according to claim 1,
wherein the optical system has a fixed focal length, and
wherein the following inequality is satisfied:

$$0.20 < f1/f < 10.00$$

where f1 is a focal length of the first lens unit, and f is a focal length of the optical system.

15. The optical system according to claim 1, wherein, during focusing from infinity to a closest distance, the first focus lens unit moves to the image side, and the second focus lens unit moves to the object side.

16. The optical system according to claim 1, further comprising an aperture stop disposed on an object side of the first lens unit.

17. The optical system according to claim 1, wherein the first focus lens unit consists of a single lens or one cemented lens, and the second focus lens unit consists of a single lens or one cemented lens.

18. The optical system according to claim 1,
wherein the optical system includes, in order from the object side to the image side, the first lens unit, the first focus lens unit, the second focus lens unit, and a final lens unit, and
wherein the final lens unit are fixed during focusing.

19. The optical system according to claim 1,
wherein the optical system includes, in order from the object side to the image side, the first lens unit, the first focus lens unit, an intermediate lens unit, the second focus lens unit, and a final lens unit, and
wherein the intermediate lens unit, and the final lens unit are fixed during focusing.

20. An imaging apparatus comprising:
an optical system; and
an image sensor configured to receive an image formed by the optical system,
wherein the optical system includes, in order from an object side to an image side, a first lens unit having a positive refractive power, a first focus lens unit having a negative refractive power, and a second focus lens unit having a positive refractive power,
wherein the first lens unit is fixed during focusing,
wherein the first focus lens unit and the second focus lens unit move so that a distance between the first focus lens unit and the second focus lens unit changes during focusing,
wherein the first lens unit includes a single lens which is disposed closest to an object and has a negative refractive power, and
wherein the following inequality is satisfied:

$$2.20 < ff2/bf < 12.00$$

where ff2 is a focal length of the second focus lens unit, and bf is a back focus of the optical system.

21. The optical system according to claim 18,
wherein the first lens unit includes three positive lenses and three negative lenses, and
wherein the final lens unit includes a positive lens and two negative lenses.

22. An optical system comprising, in order from an object side to an image side:
a first lens unit having a positive refractive power;
an aperture stop;
a first focus lens unit having a negative refractive power; and
a second focus lens unit having a positive refractive power,
wherein the optical system has a fixed focal length,
wherein the first lens unit is fixed during focusing,
wherein the first focus lens unit and the second focus lens unit move so that a distance between the first focus lens unit and the second focus lens unit changes during focusing,
wherein the first lens unit includes a single lens which is disposed closest to an object and has a negative refractive power, and
wherein the following inequalities are satisfied:

$$2.20 < ff2/bf < 12.00$$

$$0.10 < f/x1 < 2.00$$

where ff2 is a focal length of the second focus lens unit, bf is a back focus of the optical system, f is a focal length of the optical system, and x1 is a distance on an optical axis from the aperture stop to an image plane when focused on an object at infinity.

23. An optical system according to claim 22,
wherein the optical system includes, in order from the object side to the image side, the first lens unit, the first focus lens unit, the second focus lens unit, and a final lens unit, and
wherein the final lens unit are fixed during focusing.

24. An optical system according to claim 23,
wherein the first lens unit includes three positive lenses and three negative lenses, and
wherein the final lens unit includes a psoitive lens and two negative lenses.

25. An optical system comprising, in order from an object side to an image side:
a first lens unit having a positive refractive power;
a first focus lens unit having a negative refractive power; and
a second focus lens unit having a positive refractive power,
wherein the first lens unit is fixed during focusing,
wherein the first focus lens unit and the second focus lens unit move so that a distance between the first focus lens unit and the second focus lens unit changes during focusing,
wherein the first lens unit includes a single lens which is disposed closest to an object and has a negative refractive power, and
wherein the following inequalities are satisfied:

$$2.20 < ff2/bf < 12.00$$

$$0.50 < \beta ff1/\beta ff2 < 400.0$$

where ff2 is a focal length of the second focus lens unit, bf is a back focus of the optical system, f is a focal length of the optical system, $\beta ff1$ is a lateral magnification of the first focus lens unit when focused on an object at infinity, and $\beta ff2$ is a lateral magnification of the second focus lens unit when focused on an object at infinity.

26. The optical system according to claim 25,
wherein the optical system includes, in order from the object side to the image side, the first lens unit, the first focus lens unit, the second focus lens unit, and a final lens unit, and
wherein the final lens unit are fixed during focusing.

27. The optical system according to claim 26,
wherein the first lens unit includes three positive lenses and three negative lenses, and
wherein the final lens unit includes a positive lens and two negative lenses.

28. An optical system comprising, in order from an object side to an image side:
a first lens unit having a positive refractive power;
a first focus lens unit having a negative refractive power; and
a second focus lens unit having a positive refractive power,
wherein the first lens unit is fixed during focusing,
wherein the first focus lens unit and the second focus lens unit move so that a distance between the first focus lens unit and the second focus lens unit changes during focusing,
wherein the first lens unit includes a single lens which is disposed closest to an object and has a negative refractive power, and
wherein the following inequalities are satisfied:

$$2.20 < ff2/bf < 12.00$$

$$-400.00 < ff1/ff1gt < -5.00$$

where ff2 is a focal length of the second focus lens unit, bf is a back focus of the optical system, f is a focal length of the optical system, ff1gt is a distance on an optical axis from a surface closest to an object of the first focus lens unit to a surface closest to an image of the first focus lens unit, and ff1 is a focal length of the first focus lens unit.

29. The optical system according to claim 28,
wherein the optical system includes, in order from the object side to the image side, the first lens unit, the first focus lens unit, the second focus lens unit, and a final lens unit, and
wherein the final lens unit are fixed during focusing.

30. The optical system according to claim 29,
wherein the first lens unit includes three positive lenses and three negative lenses, and
wherein the final lens unit includes a positive lens and two negative lenses.

* * * * *